(12) United States Patent
Jang et al.

(10) Patent No.: US 7,202,925 B2
(45) Date of Patent: Apr. 10, 2007

(54) OPTICAL SHEET ASSEMBLY AND LIQUID CRYSTAL DISPLAY APPARATUS HAVING THE SAME

(75) Inventors: Yong-Kyu Jang, Suwon-si (KR); Won-Sang Park, Yongin-si (KR); Jae-Hyun Kim, Seoul (KR); Sang-Woo Kim, Suwon-si (KR); Sung-Eun Cha, Geojae-si (KR); Jae-Young Lee, Seoul (KR)

(73) Assignee: Samsung Electronics Co., Ltd. (KR)

( * ) Notice: Subject to any disclaimer, the term of this patent is extended or adjusted under 35 U.S.C. 154(b) by 221 days.

(21) Appl. No.: 10/903,432

(22) Filed: Jul. 30, 2004

(65) Prior Publication Data

US 2005/0024563 A1    Feb. 3, 2005

(30) Foreign Application Priority Data

Jul. 31, 2003    (KR) ............... 10-2003-0053264
Jul. 31, 2003    (KR) ............... 10-2003-0053266

(51) Int. Cl.
*G02F 1/1335*    (2006.01)

(52) U.S. Cl. ............... 349/114; 349/117; 349/119; 349/121

(58) Field of Classification Search ............... 349/114
See application file for complete search history.

(56) References Cited

U.S. PATENT DOCUMENTS

2004/0169801 A1*    9/2004    Kabe et al. ............... 349/114

* cited by examiner

*Primary Examiner*—Andrew Schechter
*Assistant Examiner*—Lucy Chien
(74) *Attorney, Agent, or Firm*—Cantor Colburn LLP

(57) ABSTRACT

A liquid crystal display panel includes a liquid crystal layer having a twist angle of ±10 degree. An upper polarizer is disposed over an upper substrate of the liquid crystal display panel, and includes an absorption axis forming at an angle of 47±10 degree in a clockwise direction with respect to a major axis. An upper $\lambda/2$ retardation film is disposed between the upper substrate and the upper polarizer, and includes $\Delta nd1$ of 260±10 nm and a slow axis forming at an angle of 166±10 degree in the clockwise direction with respect to the absorption axis. An upper $\lambda/4$ retardation film is disposed between the upper substrate and the upper $\lambda/2$ retardation film, and includes $\Delta nd2$ of 140±10 nm and a slow axis forming at an angle of 111±10 degree in the clockwise direction with respect to the absorption axis. Therefore, the optical condition of the optical film assembly is optimized to improve an image display quality.

12 Claims, 20 Drawing Sheets

US 7,202,925 B2

OPTICAL SHEET ASSEMBLY AND LIQUID CRYSTAL DISPLAY APPARATUS HAVING THE SAME

CROSS-REFERENCE OF RELATED APPLICATIONS

The present application claims priority from Korean Patent Application No. 2003-53264, filed on Jul. 31, 2003 and Korean Patent Application No. 2003-53266, filed on Jul. 31, 2003, the disclosure of which is hereby incorporated herein by reference in their entireties.

BACKGROUND OF THE INVENTION

1. Field of the Invention

The present invention relates to an optical sheet assembly and a liquid crystal display apparatus having the optical sheet assembly. More particularly, the present invention relates to an optical sheet assembly capable of optimizing optical condition and a liquid crystal display (LCD) apparatus having the optical sheet assembly.

2. Description of the Related Art

A reflective type LCD apparatus, in general, displays an image using a natural light that is provided from an exterior to the reflective type LCD apparatus so that an amount of the natural light decreases in a dark place, thereby deteriorating an image display quality.

A transmissive type LCD apparatus displays the image using an artificial light that is generated from a light source, for example, such as a backlight to display the image having a good quality in the dark place. A power consumption of the transmissive type LCD apparatus, however, is greater than that of the reflective type LCD apparatus. Therefore, a size of a portable display apparatus having a battery may be increased.

A transmissive-reflective type LCD apparatus includes a reflection mode and a transmission mode to display the image having good quality using the artificial light in the dark place. The transmissive-reflective type LCD apparatus also displays the image using the natural light in a bright place so that a power consumption of the transmissive-reflective type LCD apparatus is decreased.

The optical condition of the transmissive-reflective type LCD apparatus is determined by the reflection mode so that the transmission mode of the optical condition is designed with respect to a black color. Therefore, a light transmittance of the transmission mode of the transmissive-reflective type LCD apparatus is decreased so that the light transmittance of the transmission mode of the transmissive-reflective type LCD apparatus may be a half of that of the transmissive type LCD apparatus.

BRIEF SUMMARY OF THE INVENTION

The present invention provides an optical film assembly capable of optimizing an optical condition to improve a light transmittance, a contrast ratio and a viewing angle.

The present invention also provides a liquid crystal display (LCD) apparatus having the optical film assembly.

The optical film assembly for a liquid crystal display panel in accordance with an aspect of the present invention includes an upper polarizer, an upper $\lambda/2$ retardation film and an upper $\lambda/4$ retardation film. The liquid crystal display panel includes a liquid crystal layer having a twist angle of about −10 degree to about +10 degree. The upper polarizer is disposed over an upper substrate of the liquid crystal display panel. The upper polarizer includes an absorption axis forming about 37 degree to about 57 degree in a clockwise direction with respect to a major axis of a liquid crystal of the liquid crystal layer, and the liquid crystal is disposed adjacent to the upper substrate. The upper $\lambda/2$ retardation film is disposed between the upper substrate and the upper polarizer. The upper $\lambda/2$ retardation film includes a first optical characteristics $\Delta nd1$ of about 250 nm to about 270 nm. A slow axis of the upper $\lambda/2$ retardation film forms at an angle of about 156 degree to about 176 degree in the clockwise direction with respect to the absorption axis. The upper $\lambda/4$ retardation film is disposed between the upper substrate and the upper $\lambda/2$ retardation film. The upper $\lambda/4$ retardation film includes a second optical characteristics $\Delta nd2$ of about 130 nm to about 150 nm. A slow axis of the upper $\lambda/4$ retardation film forms at an angle of about 101 degree to about 121 degree in the clockwise direction with respect to the absorption axis. Here, '$\Delta n$', 'd1' and 'd2' denote an anisotropy of a refractive index, a thickness of the upper $\lambda/2$ retardation film and a thickness of the upper $\lambda/4$ retardation film, respectively.

The optical film assembly for a liquid crystal display panel in accordance with another aspect of the present invention includes a lower polarizer, a lower $\lambda/2$ retardation film and a lower $\lambda/4$ retardation film. The liquid crystal display panel includes a liquid crystal layer having a twist angle of about −10 degree to about +10 degree. The lower polarizer is disposed under a lower substrate of the liquid crystal display panel. The lower polarizer includes an absorption axis forming at an angle of about 38 degree to about 58 degree in a clockwise direction with respect to a major axis of a liquid crystal of the liquid crystal layer, and the liquid crystal is disposed adjacent to the lower substrate. The lower $\lambda/2$ retardation film is disposed between the lower substrate and the lower polarizer. The lower $\lambda/2$ retardation film includes a first optical characteristics $\Delta nd1$ of about 260 nm to about 280 nm. The slow axis of the lower $\lambda/2$ retardation film forms at an angle of about 65 degree to about 85 degree in the clockwise direction with respect to the absorption axis. The lower $\lambda/4$ retardation film is disposed between the lower substrate and the lower $\lambda/2$ retardation film. The lower $\lambda/4$ retardation film includes a second optical characteristics $\Delta nd2$ of about 120 nm to about 140 nm. A slow axis of the lower $\lambda/4$ retardation film forms at an angle of about −1 degree to about 19 degree in the clockwise direction with respect to the absorption axis. Here, '$\Delta n$', 'd1' and 'd2' denote an anisotropy of a refractive index, a thickness of the lower $\lambda/2$ retardation film and a thickness of the lower $\lambda/4$ retardation film, respectively.

The optical film assembly for a liquid crystal display panel in accordance with still another aspect of the present invention includes a lower polarizer, a lower $\lambda/2$ retardation film and a lower $\lambda/4$ retardation film. The liquid crystal display panel includes a liquid crystal layer having a twist angle of about −10 degree to about +10 degree. The lower polarizer is disposed under a lower substrate of the liquid crystal display panel. The lower polarizer includes an absorption axis forming at an angle of about 122 degree to about 142 degree in a clockwise direction with respect to a major axis of a liquid crystal of the liquid crystal layer, and the liquid crystal is disposed adjacent to the lower substrate. The lower $\lambda/2$ retardation film is disposed between the lower substrate and the lower polarizer. The lower $\lambda/2$ retardation film includes a first optical characteristics $\Delta nd1$ of about 260 nm to about 280 nm. A slow axis of the lower $\lambda/2$ retardation film forms at an angle of about 95 degree to about 115 degree in the clockwise direction with respect to the absorption axis. The lower λ/4 retardation film is disposed between the lower substrate and the lower λ/2 retardation film. The lower λ/4 retardation film includes a second optical characteristics Δnd2 of about 120 nm to about 140 nm. A slow axis of the lower λ/4 retardation film forms at an angle of about 161 degree to about 181 degree in the clockwise direction with respect to the absorption axis. Here, 'Δn', 'd1' and 'd2' denote an anisotropy of a refractive index, a thickness of the lower λ/2 retardation film and a thickness of the lower λ/4 retardation film, respectively.

The optical film assembly for a liquid crystal display panel in accordance with still another aspect of the present invention includes an upper polarizer, an upper λ/2 retardation film and an upper λ/4 retardation film. The liquid crystal display panel includes a liquid crystal layer having a viewing angle of about 170 degree to about 250 degree in a clock direction with respect to a horizontal direction of the liquid crystal display panel and a twist angle of about −10 degree to about +10 degree. The upper polarizer is disposed over an upper substrate of the liquid crystal display panel, the upper polarizer including an absorption axis forming at an angle of about 67 degree to about 87 degree in the clockwise direction with respect to the horizontal direction of the liquid crystal display panel. The upper λ/2 retardation film is disposed between the upper substrate and the upper polarizer. The upper λ/2 retardation film includes a first optical characteristics Δnd1 of about 250 nm to about 270 nm. A slow axis of the upper λ/2 retardation film forms at an angle of about 81 degree to about 101 degree in the clockwise direction with respect to the horizontal direction. The upper λ/4 retardation film is disposed between the upper substrate and the upper λ/2 retardation film. The upper λ/4 retardation film includes a second optical characteristics Δnd2 of about 130 nm to about 150 nm. A slow axis of the upper λ/4 retardation film forms at an angle of about 136 degree to about 156 degree in the clockwise direction with respect to the horizontal direction. Here, 'Δn', 'd1' and 'd2' denote an anisotropy of a refractive index, a thickness of the upper λ/2 retardation film and a thickness of the upper λ/4 retardation film, respectively.

The optical film assembly for a liquid crystal display panel in accordance with still another aspect of the present invention includes a lower polarizer, a lower λ/2 retardation film and a lower λ/4 retardation film. The liquid crystal display panel includes a liquid crystal layer having a viewing angle of about 170 degree to about 250 degree in a clock direction with respect to a horizontal direction of the liquid crystal display panel and a twist angle of about −10 degree to about +10 degree. The lower polarizer is disposed under a lower substrate of the liquid crystal display panel. The lower polarizer includes an absorption axis forming at an angle of about 8 degree to about 28 degree in a clockwise direction with respect to the horizontal direction of the liquid crystal display panel. The lower λ/2 retardation film is disposed between the lower substrate and the lower polarizer. The lower λ/2 retardation film includes a first optical characteristics Δnd1 of about 260 nm to about 280 nm. A slow axis of the lower λ/2 retardation film forms at an angle of about 113 degree to about 133 degree in the clockwise direction with respect to the horizontal direction. The lower λ/4 retardation film is disposed between the lower substrate and the lower λ/2 retardation film. The lower λ/4 retardation film includes a second optical characteristics Δnd2 of about 120 nm to about 140 nm. A slow axis of the lower λ/4 retardation film forms at an angle of about −1 degree to about 19 degree in the clockwise direction with respect to the horizontal direction. Here, 'Δn', 'd1' and 'd2' denote an anisotropy of a refractive index, a thickness of the lower λ/2 retardation film and a thickness of the lower λ/4 retardation film, respectively.

The optical film assembly for a liquid crystal display panel in accordance with still another aspect of the present invention includes a lower polarizer, a lower λ/2 retardation film and a lower λ/4 retardation film. The liquid crystal display panel includes a liquid crystal layer having a viewing angle of about 170 degree to about 250 degree in a clock direction with respect to a horizontal direction of the liquid crystal display panel and a twist angle of about −10 degree to about +10 degree. The lower polarizer is disposed under a lower substrate of the liquid crystal display panel. The lower polarizer includes an absorption axis forming at an angle of about 152 degree to about 172 degree in a clockwise direction with respect to the horizontal direction of the liquid crystal display panel. The lower λ/2 retardation film is disposed between the lower substrate and the lower polarizer. The lower λ/2 retardation film includes a first optical characteristics Δnd1 of about 260 nm to about 280 nm. A slow axis of the lower λ/2 retardation film forms at an angle of about 47 degree to about 67 degree in the clockwise direction with respect to the horizontal direction. The lower λ/4 retardation film is disposed between the lower substrate and the lower λ/2 retardation film. The lower λ/4 retardation film includes a second optical characteristics Δnd2 of about 120 nm to about 140 nm, a slow axis of the lower λ/4 retardation film forming at an angle of about 161 degree to about 181 degree in the clockwise direction with respect to the horizontal direction. Here, 'Δn', 'd1' and 'd2' denote an anisotropy of a refractive index, a thickness of the lower λ/2 retardation film and a thickness of the lower λ/4 retardation film, respectively.

The liquid crystal display apparatus in accordance with an aspect of the present invention includes a liquid crystal display panel, an upper polarizer, an upper λ/2 retardation film and an upper λ/4 retardation film. The liquid crystal display panel includes an upper substrate, a lower substrate corresponding to the upper substrate and a liquid crystal layer disposed between the upper and lower substrates to have a twist angle of about −10 degree to about +10 degree. The upper polarizer is disposed over the upper substrate. The upper polarizer includes an absorption axis forming at an angle of about 37 degree to about 57 degree in a clockwise direction with respect to a major axis of a liquid crystal of the liquid crystal layer, and the liquid crystal is disposed adjacent to the upper substrate. The upper λ/2 retardation film is disposed between the upper substrate and the upper polarizer. The upper λ/2 retardation film includes a first optical characteristics Δnd1 of about 250 nm to about 270 nm. A slow axis of the upper λ/2 retardation film forms at an angle of about 156 degree to about 176 degree in the clockwise direction with respect to the absorption axis. The upper λ/4 retardation film is disposed between the upper substrate and the upper λ/2 retardation film. The upper λ/4 retardation film includes a second optical characteristics Δnd2 of about 130 nm to about 150 nm. A slow axis of the upper λ/4 retardation film forms at an angle of about 101 degree to about 121 degree in the clockwise direction with respect to the absorption axis. Here, 'Δn', 'd1' and 'd2' denote an anisotropy of a refractive index, a thickness of the upper λ/2 retardation film and a thickness of the upper λ/4 retardation film, respectively.

The liquid crystal display apparatus in accordance with another aspect of the present invention includes a liquid crystal display panel, a lower polarizer, a lower λ/2 retardation film and a lower λ/4 retardation film. The liquid crystal display panel includes an upper substrate, a lower substrate and a liquid crystal layer disposed between the upper and lower substrates to have a twist angle of about −10 degree to about +10 degree. The lower polarizer is disposed under the lower substrate. The lower polarizer includes an absorption axis forming at an angle of about 38 degree to about 58 degree in a clockwise direction with respect to a major axis of a liquid crystal of the liquid crystal layer, and the liquid crystal is disposed adjacent to the lower substrate. The lower λ/2 retardation film is disposed between the lower substrate and the lower polarizer. The lower λ/2 retardation film includes a first optical characteristics Δnd1 of about 260 nm to about 280 nm. A slow axis of the lower λ/2 retardation film forms at an angle of about 65 degree to about 85 degree in the clockwise direction with respect to the absorption axis. The lower λ/4 retardation film is disposed between the lower substrate and the lower λ/2 retardation film. The lower λ/4 retardation film includes a second optical characteristics Δnd2 of about 120 nm to about 140 nm. A slow axis of the lower λ/4 retardation film forms at an angle of about −1 degree to about 19 degree in the clockwise direction with respect to the absorption axis. Here, 'Δn', 'd1' and 'd2' denote an anisotropy of a refractive index, a thickness of the lower λ/2 retardation film and a thickness of the lower λ/4 retardation film, respectively.

The liquid crystal display apparatus in accordance with still another aspect of the present invention includes a liquid crystal display panel, a lower polarizer, a lower λ/2 retardation film and a lower λ/4 retardation film. The liquid crystal display panel includes an upper substrate, a lower substrate and a liquid crystal layer disposed between the upper and lower substrates to have a twist angle of about −10 degree to about +10 degree. The lower polarizer is disposed under the lower substrate. The lower polarizer includes an absorption axis forming at an angle of about 132 degree to about 152 degree in a clockwise direction with respect to a major axis of a liquid crystal of the liquid crystal layer, and the liquid crystal is disposed adjacent to the lower substrate. The lower λ/2 retardation film is disposed between the lower substrate and the lower polarizer. The lower λ/2 retardation film includes a first optical characteristics Δnd1 of about 260 nm to about 280 nm. A slow axis of the lower λ/2 retardation film forms at an angle of about 95 degree to about 115 degree in the clockwise direction with respect to the absorption axis. The lower λ/4 retardation film is disposed between the lower substrate and the lower λ/2 retardation film. The lower λ/4 retardation film includes a second optical characteristics Δnd2 of about 120 nm to about 140 nm. A slow axis of the lower λ/4 retardation film forms at an angle of about 161 degree to about 181 degree in the clockwise direction with respect to the absorption axis. Here, 'Δn', 'd1' and 'd2' denote an anisotropy of a refractive index, a thickness of the lower λ/2 retardation film and a thickness of the lower λ/4 retardation film, respectively.

The liquid crystal display apparatus in accordance with still another aspect of the present invention includes a liquid crystal display panel, an upper polarizer, an upper λ/2 retardation film and an upper λ/4 retardation film. The liquid crystal display panel includes an upper substrate, a lower substrate corresponding to the upper substrate and a liquid crystal layer disposed between the upper and lower substrates to have a viewing angle of about 170 degree to about 250 degree in a clock direction with respect to a horizontal direction of the liquid crystal display panel and a twist angle of about −10 degree to about +10 degree. The upper polarizer is disposed over the upper substrate. The upper polarizer includes an absorption axis forming at an angle of about 67 degree to about 87 degree in the clockwise direction with respect to the horizontal direction of the liquid crystal display panel. The upper λ/2 retardation film is disposed between the upper substrate and the upper polarizer. The upper λ/2 retardation film includes a first optical characteristics Δnd1 of about 250 nm to about 270 nm. A slow axis of the upper λ/2 retardation film forms at an angle of about 81 degree to about 101 degree in the clockwise direction with respect to the horizontal direction. The upper λ/4 retardation film is disposed between the upper substrate and the upper λ/2 retardation film. The upper λ/4 retardation film includes a second optical characteristics Δnd2 of about 130 nm to about 150 nm. A slow axis of the upper λ/4 retardation film forms at an angle of about 136 degree to about 156 degree in the clockwise direction with respect to the horizontal direction. Here, 'Δn', 'd1' and 'd2' denote an anisotropy of a refractive index, a thickness of the upper λ/2 retardation film and a thickness of the upper λ/4 retardation film, respectively.

The liquid crystal display apparatus in accordance with still another aspect of the present invention includes a liquid crystal display panel, a lower polarizer, a lower λ/2 retardation film and a lower λ/4 retardation film. The liquid crystal display panel includes an upper substrate, a lower substrate and a liquid crystal layer disposed between the upper and lower substrates to have a viewing angle of about 170 degree to about 250 degree in a clock direction with respect to a horizontal direction of the liquid crystal display panel and a twist angle of about −10 degree to about +10 degree. The lower polarizer is disposed under the lower substrate. The lower polarizer includes an absorption axis forming at an angle of about 8 degree to about 28 degree in a clockwise direction with respect to the horizontal direction of the liquid crystal display panel. The lower λ/2 retardation film is disposed between the lower substrate and the lower polarizer. The lower λ/2 retardation film includes a first optical characteristics Δnd1 of about 260 nm to about 280 nm. A slow axis of the lower λ/2 retardation film forms at an angle of about 113 degree to about 133 degree in the clockwise direction with respect to the horizontal direction. The lower λ/4 retardation film is disposed between the lower substrate and the lower λ/2 retardation film. The lower λ/4 retardation film includes a second optical characteristics Δnd2 of about 120 nm to about 140 nm. A slow axis of the lower λ/4 retardation film forms at an angle of about −1 degree to about 19 degree in the clockwise direction with respect to the horizontal direction. Here, 'Δn', 'd1' and 'd2' denote an anisotropy of a refractive index, a thickness of the lower λ/2 retardation film and a thickness of the lower λ/4 retardation film, respectively.

The liquid crystal display apparatus in accordance with still another aspect of the present invention includes a liquid crystal display panel, a lower polarizer, a lower λ/2 retardation film and a lower λ/4 retardation film. The liquid crystal display panel includes an upper substrate, a lower substrate and a liquid crystal layer disposed between the upper and lower substrates to have a viewing angle of about 170 degree to about 250 degree in a clock direction with respect to a horizontal direction of the liquid crystal display panel and a twist angle of about −10 degree to about +10 degree. The lower polarizer is disposed under the lower substrate. The lower polarizer includes an absorption axis forming at an angle of about 152 degree to about 172 degree in a clockwise direction with respect to the horizontal direction of the liquid crystal display panel. The lower λ/2 retardation film is disposed between the lower substrate and the lower polarizer. The lower λ/2 retardation film includes a first optical characteristics $\Delta nd1$ of about 260 nm to about 280 nm. A slow axis of the lower $\lambda/2$ retardation film forms at an angle of about 47 degree to about 67 degree in the clockwise direction with respect to the horizontal direction. The lower $\lambda/4$ retardation film is disposed between the lower substrate and the lower $\lambda/2$ retardation film. The lower $\lambda/4$ retardation film includes a second optical characteristics $\Delta nd2$ of about 120 nm to about 140 nm. A slow axis of the lower $\lambda/4$ retardation film forms at an angle of about 161 degree to about 181 degree in the clockwise direction with respect to the horizontal direction. Here, '$\Delta n$', 'd1' and 'd2' denote an anisotropy of a refractive index, a thickness of the lower $\lambda/2$ retardation film and a thickness of the lower $\lambda/4$ retardation film, respectively.

The liquid crystal display apparatus in accordance with still another aspect of the present invention includes a liquid crystal display panel, a lower polarizer, a lower $\lambda/2$ retardation film, a lower $\lambda/4$ retardation film, an upper polarizer, an upper $\lambda/2$ retardation film and an upper $\lambda/4$ retardation film. The liquid crystal display panel includes an upper substrate, a lower substrate and a liquid crystal layer disposed between the upper and lower substrates to have a viewing angle of about 170 degree to about 250 degree in a clock direction with respect to a horizontal direction of the liquid crystal display panel and a twist angle of about −10 degree to about +10 degree. The lower polarizer is disposed under the lower substrate. The lower polarizer includes a first absorption axis forming at an angle of about 8 degree to about 28 degree in a clockwise direction with respect to the horizontal direction of the liquid crystal display panel. The lower $\lambda/2$ retardation film is disposed between the lower substrate and the lower polarizer. The lower $\lambda/2$ retardation film includes a first optical characteristics $\Delta nd1$ of about 260 nm to about 280 nm. A slow axis of the lower $\lambda/2$ retardation film forms at an angle of about 113 degree to about 133 degree in the clockwise direction with respect to the horizontal direction. The lower $\lambda/4$ retardation film is disposed between the lower substrate and the lower $\lambda/2$ retardation film. The lower $\lambda/4$ retardation film includes a second optical characteristics $\Delta nd2$ of about 120 nm to about 140 nm. A slow axis of the lower $\lambda/4$ retardation film forms at an angle of about −1 degree to about 19 degree in the clockwise direction with respect to the horizontal direction. The upper polarizer is disposed over the upper substrate of the liquid crystal display panel. The upper polarizer includes a second absorption axis forming at an angle of about 67 degree to about 87 degree in the clockwise direction with respect to the horizontal direction of the liquid crystal display panel. The upper $\lambda/2$ retardation film disposed between the upper substrate and the upper polarizer. The upper $\lambda/2$ retardation film includes a third optical characteristics $\Delta nd3$ of about 250 nm to about 270 nm. A slow axis of the upper $\lambda/2$ retardation film forms at an angle of about 81 degree to about 101 degree in the clockwise direction with respect to the horizontal direction. The upper $\lambda/4$ retardation film is disposed between the upper substrate and the upper $\lambda/2$ retardation film. The upper $\lambda/4$ retardation film includes a fourth optical characteristics $\Delta nd4$ of about 130 nm to about 150 nm. A slow axis of the upper $\lambda/4$ retardation film forms at an angle of about 136 degree to about 156 degree in the clockwise direction with respect to the horizontal direction. Here, '$\Delta n$', 'd1', 'd2', 'd3' and 'd4' denote an anisotropy of a refractive index, a thickness of the lower $\lambda/2$ retardation film, a thickness of the lower $\lambda/4$ retardation film, a thickness of the upper $\lambda/2$ retardation film and a thickness of the upper $\lambda/4$ retardation film, respectively.

The liquid crystal display apparatus in accordance with still another aspect of the present invention includes a liquid crystal display panel, an upper polarizer, an upper $\lambda/2$ retardation film and an upper $\lambda/4$ retardation film. The liquid crystal display panel includes an upper substrate, a lower substrate corresponding to the upper substrate and a liquid crystal layer disposed between the upper and lower substrates to have a twist angle of about 62 degree to about 82 degree. The upper polarizer is disposed over the upper substrate. The upper $\lambda/2$ retardation film is disposed between the upper substrate and the upper polarizer. The upper $\lambda/2$ retardation film includes a first optical characteristics $\Delta nd1$ of about 250 nm to about 270 nm. A slow axis of the upper $\lambda/2$ retardation film forms at an angle of about 6 degree to about 26 degree in a clockwise direction with respect to an absorption axis of the upper polarizer. The upper $\lambda/4$ retardation film is disposed between the upper substrate and the upper $\lambda/2$ retardation film. The upper $\lambda/4$ retardation film includes a second optical characteristics $\Delta nd2$ of about 130 nm to about 150 nm. A slow axis of the upper $\lambda/4$ retardation film forms at an angle of about 64 degree to about 84 degree in the clockwise direction with respect to the absorption axis. Here, '$\Delta n$', 'd1' and 'd2' denote an anisotropy of a refractive index, a thickness of the upper $\lambda/2$ retardation film and a thickness of the upper $\lambda/4$ retardation film, respectively.

The liquid crystal display apparatus in accordance with still another aspect of the present invention includes a liquid crystal display panel, an upper polarizer, an upper $\lambda/2$ retardation film and an upper $\lambda/4$ retardation film. The liquid crystal display panel includes an upper substrate, a lower substrate corresponding to the upper substrate and a liquid crystal layer disposed between the upper and lower substrates to have a twist angle of about 50 degree to about 70 degree. The upper polarizer is disposed over the upper substrate. The upper $\lambda/2$ retardation film is disposed between the upper substrate and the upper polarizer. The upper $\lambda/2$ retardation film includes a first optical characteristics $\Delta nd1$ of about 250 nm to about 270 nm. A slow axis of the upper $\lambda/2$ retardation film forms at an angle of about 94 degree to about 114 degree in a clockwise direction with respect to an absorption axis of the upper polarizer. The upper $\lambda/4$ retardation film is disposed between the upper substrate and the upper $\lambda/2$ retardation film. The upper $\lambda/4$ retardation film includes a second optical characteristics $\Delta nd2$ of about 130 nm to about 150 nm. A slow axis of the upper $\lambda/4$ retardation film forms at an angle of about 159 degree to about 179 degree in the clockwise direction with respect to the absorption axis. Here, '$\Delta n$', 'd1' and 'd2' denote an anisotropy of a refractive index, a thickness of the upper $\lambda/2$ retardation film and a thickness of the upper $\lambda/4$ retardation film, respectively.

The liquid crystal display apparatus in accordance with still another aspect of the present invention includes a liquid crystal display panel, an upper polarizer, an upper $\lambda/2$ retardation film and an upper $\lambda/4$ retardation film. The liquid crystal display panel includes an upper substrate, a lower substrate corresponding to the upper substrate and a liquid crystal layer disposed between the upper and lower substrates to have a twist angle of about 50 degree to about 70 degree. The upper polarizer is disposed over the upper substrate. The upper $\lambda/2$ retardation film is disposed between the upper substrate and the upper polarizer. The upper $\lambda/2$ retardation film includes a first optical characteristics $\Delta nd1$ of about 250 nm to about 270 nm. A slow axis of the upper $\lambda/2$ retardation film forms at angle of about 97 degree to about 117 degree in a clockwise direction with respect to an absorption axis of the upper polarizer. The upper λ/4 retardation film is disposed between the upper substrate and the upper λ/2 retardation film. The upper λ/4 retardation film includes a second optical characteristics Δnd2 of about 130 nm to about 150 nm. A slow axis of the upper λ/4 retardation film forms at an angle of about 164 degree to about 184 degree in the clockwise direction with respect to the absorption axis. Here, 'Δn', 'd1' and 'd2' denote an anisotropy of a refractive index, a thickness of the upper λ/2 retardation film and a thickness of the upper λ/4 retardation film, respectively.

The liquid crystal display apparatus in accordance with still another aspect of the present invention includes a liquid crystal display panel, an upper polarizer, an upper λ/2 retardation film and an upper λ/4 retardation film. The liquid crystal display panel includes an upper substrate, a lower substrate corresponding to the upper substrate and a liquid crystal layer disposed between the upper and lower substrates to have a viewing angle of about 170 degree to about 250 degree in a clock direction with respect to a horizontal direction of the liquid crystal display panel and a twist angle of about 50 degree to about 70 degree. The upper polarizer is disposed over the upper substrate. The upper polarizer includes an absorption axis forming at an angle of about 100 degree to about 120 degree in the clockwise direction with respect to the horizontal direction of the liquid crystal display panel. The upper λ/2 retardation film is disposed between the upper substrate and the upper polarizer. The upper λ/2 retardation film includes a first optical characteristics Δnd1 of about 250 nm to about 270 nm. A slow axis of the upper λ/2 retardation film forms at an angle of about 27 degree to about 47 degree in the clockwise direction with respect to the horizontal direction. The upper λ/4 retardation film is disposed between the upper substrate and the upper λ/2 retardation film. The upper λ/4 retardation film includes a second optical characteristics Δnd2 of about 130 nm to about 150 nm. A slow axis of the upper λ/4 retardation film forms at an angle of about 94 degree to about 114 degree in the clockwise direction with respect to the horizontal direction. Here, 'Δn', 'd1' and 'd2' denote an anisotropy of a refractive index, a thickness of the upper λ/2 retardation film and a thickness of the upper λ/4 retardation film, respectively.

The liquid crystal display apparatus in accordance with still another aspect of the present invention includes a liquid crystal display panel, an upper polarizer, an upper λ/2 retardation film and an upper λ/4 retardation film. The liquid crystal display panel including an upper substrate, a lower substrate corresponding to the upper substrate and a liquid crystal layer disposed between the upper and lower substrates to have a viewing angle of about 230 degree to about 310 degree in a clock direction with respect to a horizontal direction of the liquid crystal display panel and a twist angle of about 62 degree to about 82 degree. The upper polarizer is disposed over the upper substrate. The upper polarizer includes an absorption axis forming at an angle of about 140 degree to about 160 degree in the clockwise direction with respect to the horizontal direction of the liquid crystal display panel. The upper λ/2 retardation film is disposed between the upper substrate and the upper polarizer. The upper λ/2 retardation film includes a first optical characteristics Δnd1 of about 250 nm to about 270 nm. A slow axis of the upper λ/2 retardation film forms at an angle of about 156 degree to about 176 degree in the clockwise direction with respect to the horizontal direction. The upper λ/4 retardation film is disposed between the upper substrate and the upper λ/2 retardation film. The upper λ/4 retardation film includes a second optical characteristics Δnd2 of about 130 nm to about 150 nm. A slow axis of the upper λ/4 retardation film forms at an angle of about 34 degree to about 54 degree in the clockwise direction with respect to the horizontal direction. Here, 'Δn', 'd1' and 'd2' denote an anisotropy of a refractive index, a thickness of the upper λ/2 retardation film and a thickness of the upper λ/4 retardation film, respectively.

The liquid crystal display apparatus in accordance with still another aspect of the present invention includes a liquid crystal display panel, an upper polarizer, an upper λ/2 retardation film and an upper λ/4 retardation film. The liquid crystal display panel includes an upper substrate, a lower substrate corresponding to the upper substrate and a liquid crystal layer disposed between the upper and lower substrates to have a viewing angle of about 170 degree to about 250 degree in a clock direction with respect to a horizontal direction of the liquid crystal display panel and a twist angle of about 50 degree to about 70 degree. The upper polarizer is disposed over the upper substrate. The upper polarizer includes an absorption axis forming at an angle of about 114 degree to about 134 degree in the clockwise direction with respect to the horizontal direction of the liquid crystal display panel. The upper λ/2 retardation film is disposed between the upper substrate and the upper polarizer. The upper λ/2 retardation film includes a first optical characteristics Δnd1 of about 250 nm to about 270 nm. A slow axis of the upper λ/2 retardation film forms at an angle of about 38 degree to about 58 degree in the clockwise direction with respect to the horizontal direction. The upper λ/4 retardation film is disposed between the upper substrate and the upper λ/2 retardation film. The upper λ/4 retardation film includes a second optical characteristics Δnd2 of about 130 nm to about 150 nm. A slow axis of the upper λ/4 retardation film forms at an angle of about 103 degree to about 123 degree in the clockwise direction with respect to the horizontal direction. Here, 'Δn', 'd1' and 'd2' denote an anisotropy of a refractive index, a thickness of the upper λ/2 retardation film and a thickness of the upper λ/4 retardation film, respectively.

The liquid crystal display apparatus in accordance with still another aspect of the present invention includes a liquid crystal display panel, a lower polarizer, a lower λ/2 retardation film, a lower λ/4 retardation film, an upper λ/2 retardation film and an upper λ/4 retardation film. The liquid crystal display panel includes an upper substrate, a lower substrate and a liquid crystal layer disposed between the upper and lower substrates to have a twist angle of about 62 degree to about 82 degree. The lower polarizer is disposed under the lower substrate. The lower λ/2 retardation film is disposed between the lower substrate and the lower polarizer. The lower λ/2 retardation film includes a first optical characteristics Δnd1 of about 260 nm to about 280 nm. The lower λ/4 retardation film is disposed between the lower substrate and the lower λ/2 retardation film. The lower λ/4 retardation film includes a second optical characteristics Δnd2 of about 135 nm to about 155 nm. The upper λ/2 retardation film is disposed over the upper substrate. A slow axis of the upper λ/2 retardation film forms at an angle of about 155 degree to about 175 degree in a clockwise direction with respect to an absorption axis of the lower polarizer. The upper λ/4 retardation film is disposed between the upper substrate and the upper λ/2 retardation film. A slow axis of the upper λ/4 retardation film forms at an angle of about 96 degree to about 116 degree in the clockwise direction with respect to the absorption axis of the lower polarizer. Here, 'Δn', 'd1' and 'd2' denote an anisotropy of a refractive index, a thickness of the lower λ/2 retardation film and a thickness of the lower λ/4 retardation film, respectively.

The liquid crystal display apparatus in accordance with still another aspect of the present invention includes a liquid crystal display panel, a lower polarizer, a lower λ/2 retardation film, a lower λ/4 retardation film, an upper λ/2 retardation film and an upper λ/4 retardation film. The liquid crystal display panel includes an upper substrate, a lower substrate and a liquid crystal layer disposed between the upper and lower substrates to have a twist angle of about 50 degree to about 70 degree. The lower polarizer is disposed under the lower substrate. The lower λ/2 retardation film is disposed between the lower substrate and the lower polarizer. The lower λ/2 retardation film includes a first optical characteristics Δnd1 of about 260 nm to about 280 nm. The lower λ/4 retardation film is disposed between the lower substrate and the lower λ/2 retardation film. The lower λ/4 retardation film includes a second optical characteristics Δnd2 of about 130 nm to about 150 nm. The upper λ/2 retardation film is disposed over the upper substrate. A slow axis of the upper λ/2 retardation film forms at an angle of about 28 degree to about 48 degree in a clockwise direction with respect to an absorption axis of the lower polarizer. The upper λ/4 retardation film is disposed between the upper substrate and the upper λ/2 retardation film. A slow axis of the upper λ/4 retardation film forms at an angle of about 94 degree to about 114 degree in the clockwise direction with respect to the absorption axis of the lower polarizer. Here, 'Δn', 'd1' and 'd2' denote an anisotropy of a refractive index, a thickness of the lower λ/2 retardation film and a thickness of the lower λ/4 retardation film, respectively.

The liquid crystal display apparatus in accordance with still another aspect of the present invention includes a liquid crystal display panel, a lower polarizer, a lower λ/2 retardation film and a lower λ/4 retardation film. The liquid crystal display panel includes an upper substrate, a lower substrate corresponding to the upper substrate and a liquid crystal layer disposed between the upper and lower substrates to have a twist angle of about 50 degree to about 70 degree. The lower polarizer is disposed under the lower substrate. The lower λ/2 retardation film is disposed between the lower substrate and the lower polarizer. The lower λ/2 retardation film includes a first optical characteristics Δnd1 of about 260 nm to about 280 nm. A slow axis of the lower λ/2 retardation film forms at an angle of about 1 degree to about 21 degree in a clockwise direction with respect to an absorption axis of the lower polarizer. The lower λ/4 retardation film is disposed between the lower substrate and the lower λ/2 retardation film. The lower λ/4 retardation film includes a second optical characteristics Δnd2 of about 130 nm to about 150 nm. A slow axis of the lower λ/4 retardation film forms at an angle of about 59 degree to about 79 degree in the clockwise direction with respect to the absorption axis. Here, 'Δn', 'd1' and 'd2' denote an anisotropy of a refractive index, a thickness of the lower λ/2 retardation film and a thickness of the lower λ/4 retardation film, respectively.

The liquid crystal display apparatus in accordance with still another aspect of the present invention includes a liquid crystal display panel, a lower polarizer, a lower λ/2 retardation film and a lower λ/4 retardation film. The liquid crystal display panel includes an upper substrate, a lower substrate corresponding to the upper substrate and a liquid crystal layer disposed between the upper and lower substrates to have a viewing angle of about 230 degree to about 310 degree in a clock direction with respect to a horizontal direction of the liquid crystal display panel and a twist angle of about 62 degree to about 82 degree. The lower polarizer is disposed over the lower substrate. The lower polarizer includes an absorption axis forming at an angle of about 110 degree to about 130 degree in the clockwise direction with respect to the horizontal direction of the liquid crystal display panel. The lower λ/2 retardation film is disposed between the lower substrate and the lower polarizer. The lower λ/2 retardation film includes a first optical characteristics Δnd1 of about 260 nm to about 280 nm. A slow axis of the lower λ/2 retardation film forms at an angle of about 95 degree to about 115 degree in the clockwise direction with respect to the horizontal direction. The lower λ/4 retardation film is disposed between the lower substrate and the lower λ/2 retardation film. The lower λ/4 retardation film includes a second optical characteristics Δnd2 of about 135 nm to about 155 nm. A slow axis of the lower λ/4 retardation film forms at an angle of about 36 degree to about 56 degree in the clockwise direction with respect to the horizontal direction. Here, 'Δn', 'd1' and 'd2' denote an anisotropy of a refractive index, a thickness of the lower λ/2 retardation film and a thickness of the lower λ/4 retardation film, respectively.

The liquid crystal display apparatus in accordance with still another aspect of the present invention includes a liquid crystal display panel, a lower polarizer, a lower λ/2 retardation film and a lower λ/4 retardation film. The liquid crystal display panel includes an upper substrate, a lower substrate corresponding to the upper substrate and a liquid crystal layer disposed between the upper and lower substrates to have a viewing angle of about 170 degree to about 250 degree in a clock direction with respect to a horizontal direction of the liquid crystal display panel and a twist angle of about 50 degree to about 70 degree. The lower polarizer is disposed over the lower substrate. The lower polarizer includes an absorption axis forming at an angle of about 136 degree to about 156 degree in the clockwise direction with respect to the horizontal direction of the liquid crystal display panel. The lower λ/2 retardation film is disposed between the lower substrate and the lower polarizer. The lower λ/2 retardation film includes a first optical characteristics Δnd1 of about 260 nm to about 280 nm. A slow axis of the lower λ/2 retardation film forms at an angle of about 152 degree to about 172 degree in the clockwise direction with respect to the horizontal direction. The lower λ/4 retardation film is disposed between the lower substrate and the lower λ/2 retardation film. The lower λ/4 retardation film includes a second optical characteristics Δnd2 of about 130 nm to about 150 nm. A slow axis of the lower λ/4 retardation film forms at an angle of about 38 degree to about 58 degree in the clockwise direction with respect to the horizontal direction. Here, 'Δn', 'd1' and 'd2' denote an anisotropy of a refractive index, a thickness of the lower λ/2 retardation film and a thickness of the lower λ/4 retardation film, respectively.

The liquid crystal display apparatus in accordance with still another aspect of the present invention includes a liquid crystal display panel, a lower polarizer, a lower λ/2 retardation film and a lower λ/4 retardation film. The liquid crystal display panel includes an upper substrate, a lower substrate corresponding to the upper substrate and a liquid crystal layer disposed between the upper and lower substrates to have a viewing angle of about 170 degree to about 250 degree in a clock direction with respect to a horizontal direction of the liquid crystal display panel and a twist angle of about 50 degree to about 70 degree. The lower polarizer is disposed over the lower substrate. The lower polarizer includes an absorption axis forming at an angle of about 150 degree to about 170 degree in the clockwise direction with respect to the horizontal direction of the liquid crystal display panel. The lower λ/2 retardation film is disposed between the lower substrate and the lower polarizer. The lower λ/2 retardation film includes a first optical characteristics Δnd1 of about 260 nm to about 280 nm. A slow axis of the lower λ/2 retardation film forms at an angle of about 161 degree to about 181 degree in the clockwise direction with respect to the horizontal direction. The lower λ/4 retardation film is disposed between the lower substrate and the lower λ/2 retardation film. The lower λ/4 retardation film includes a second optical characteristics Δnd2 of about 130 nm to about 150 nm. A slow axis of the lower λ/4 retardation film forms at an angle of about 39 degree to about 59 degree in the clockwise direction with respect to the horizontal direction. Here, 'Δn', 'd1' and 'd2' denote an anisotropy of a refractive index, a thickness of the lower λ/2 retardation film and a thickness of the lower λ/4 retardation film, respectively.

The LCD apparatus includes a reflective type LCD apparatus, a transmissive type LCD apparatus or a transmissive-reflective type LCD apparatus having a multi-cell gap.

Therefore, the optical conditions of the optical film assembly and the LCD apparatus are optimized to improve the light transmittance, the contrast ratio and the viewing angle of the LCD apparatus. In addition, the viewing angle is uniformized.

BRIEF DESCRIPTION OF THE DRAWINGS

The above and other advantages of the present invention will become more apparent by describing in detail exemplary embodiments thereof with reference to the accompanying drawings, in which.

DESCRIPTION OF THE PREFERRED EMBODIMENTS

It should be understood that the exemplary embodiments of the present invention described below may be varied modified in many different ways without departing from the inventive principles disclosed herein, and the scope of the present invention is therefore not limited to these particular following embodiments. Rather, these embodiments are provided so that this disclosure will be through and complete, and will fully convey the concept of the invention to those skilled in the art by way of example and not of limitation.

Hereinafter, the present invention will be described in detail with reference to the accompanying drawings.

Figure 1:
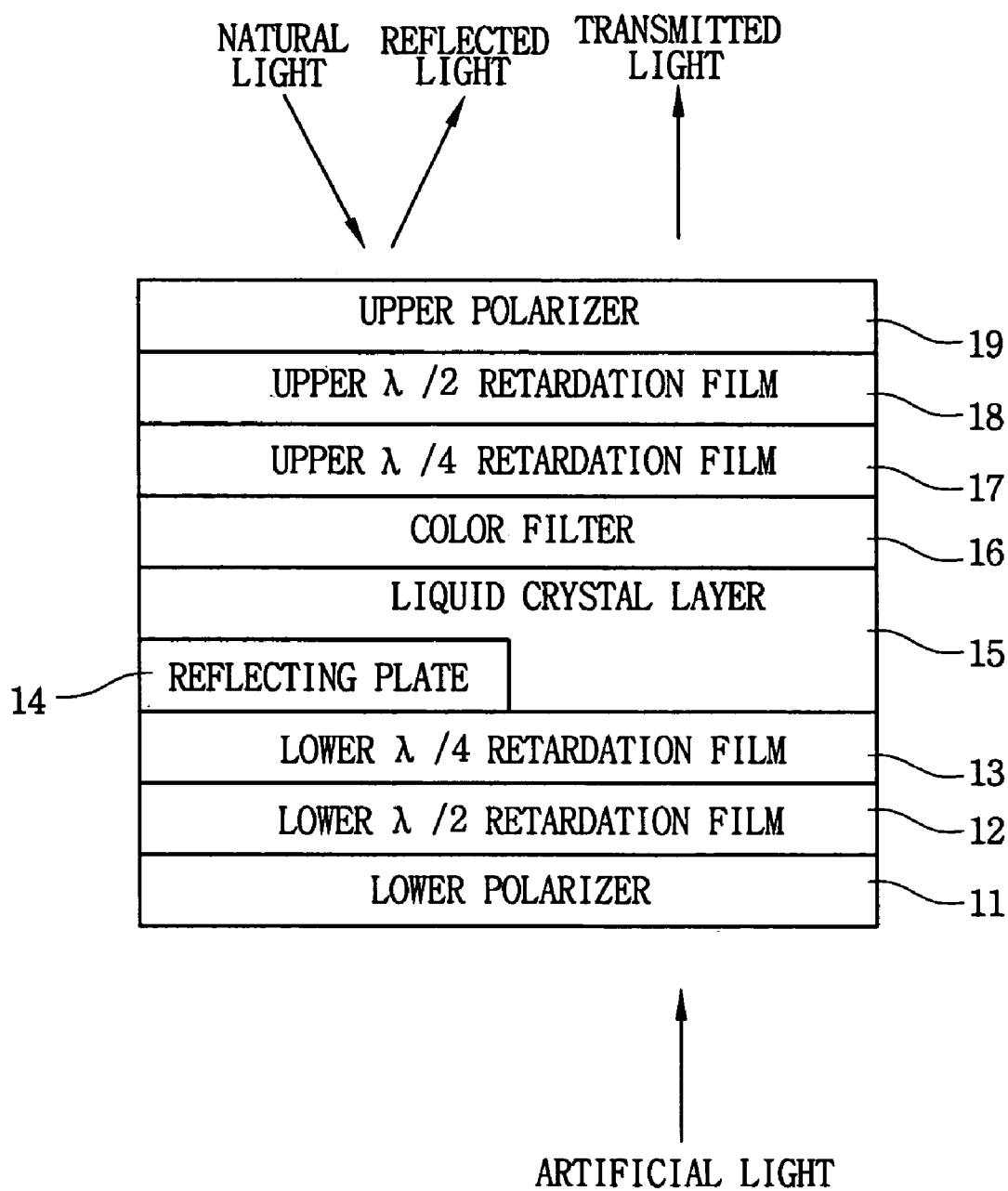
FIG. 1 is a cross-sectional view showing a transmissive-reflective type liquid crystal display (LCD) apparatus in accordance with an exemplary embodiment of the present invention.

FIG. 1 is a cross-sectional view showing a transmissive-reflective type liquid crystal display (LCD) apparatus in accordance with an exemplary embodiment of the present invention.

Referring to FIG. 1, the transmissive-reflective type LCD apparatus 10 includes a lower polarizer 11, a lower λ/2 retardation film 12 disposed on the lower polarizer 11, a lower λ/4 retardation film 13 disposed on the lower λ/2 retardation film 12, a reflecting plate 14 disposed on the lower λ/4 retardation film 13, a liquid crystal layer 15 disposed on the reflecting plate 14, a color filter 16 disposed on the liquid crystal layer 15, an upper λ/4 retardation film 17 disposed on the color filter 16, an upper λ/2 retardation film 18 disposed on the upper λ/4 retardation film 17 and an upper polarizer 19 disposed on the upper λ/2 retardation film 18. When a linearly polarized light passes through the retardation films 12, 13, 17 and 18, the linearly polarized light may be converted into an elliptically polarized light or a circularly polarized light. Also, when the elliptically polarized light or the circularly polarized light passes through the retardation films 12, 13, 17 and 18, the elliptically polarized light or the circularly polarized light may be converted into the linearly polarized light. In addition, when the linearly polarized light passes through the retardation films 12, 13, 17 and 18, the direction of the linearly polarized light may be changed. In particular, when the linearly polarized light passes through the λ/2 retardation films 12 and 18, the direction of the linearly polarized light is changed. In addition, when the linearly polarized light and the circularly polarized light pass through the λ/4 retardation films 13 and 17, the linearly polarized light and the circularly polarized light are converted into the circularly polarized light and the linearly polarized light, respectively.

In a transmission mode, an artificial light passes through the lower polarizer 11, the lower λ/2 retardation film 12, the lower λ/4 retardation film 13, the liquid crystal layer 15, the color filter 16, the upper λ/4 retardation film 17, the upper λ/2 retardation film 18 and the upper polarizer 19, in sequence, to display the image.

In a reflection mode, a natural light passes through the upper polarizer 19, the upper λ/2 retardation film 18, the upper λ/4 retardation film 17, the color filter 16 and the liquid crystal layer 15, in sequence, so that the natural light that passes through the liquid crystal layer 15 is reflected from the reflecting plate 14. The reflected light passes through the liquid crystal layer 15, the color filter 16, the upper λ/4 retardation film 17, the upper λ/2 retardation film 18 and the upper polarizer 19, in sequence, to display the image.

Figure 2:
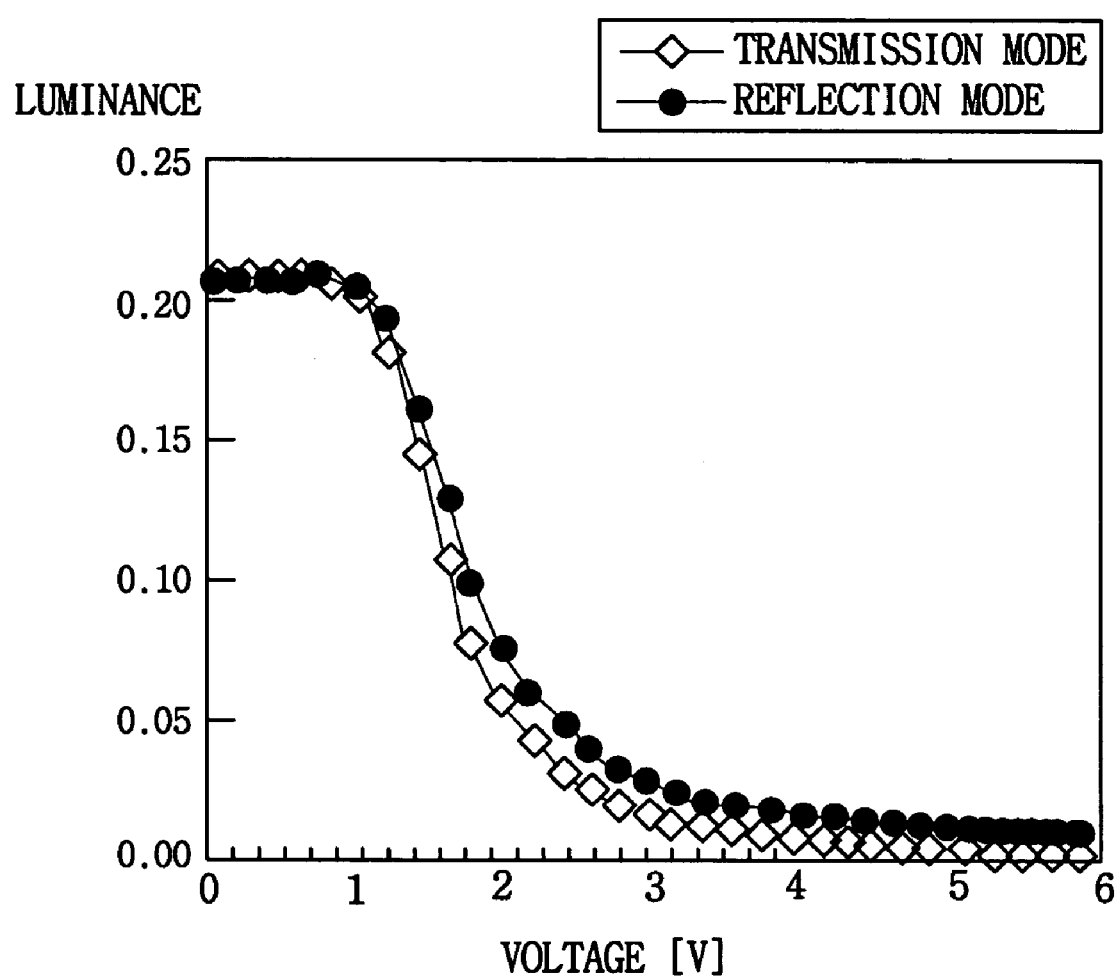
FIG. 2 is a graph showing a relationship between a luminance and a voltage applied to the LCD apparatus shown in FIG. 1.

FIG. 2 is a graph showing a relationship between a luminance and a voltage applied to the LCD apparatus shown in FIG. 1.

Referring to FIG. 2, when the LCD apparatus includes a normally white mode and a low voltage is applied to the LCD apparatus, the LCD apparatus displays white color. When the LCD apparatus includes the normally white mode and a high voltage that is higher than a driving voltage of the liquid crystal layer 15 is applied to the LCD apparatus, the LCD apparatus displays black color. A shape of a curve showing a relationship between a voltage applied to the LCD apparatus and a luminance of the transmission mode is substantially similar to that of a curve showing a relationship between the voltage applied to the LCD apparatus and a luminance of the reflection mode.

Figure 3:
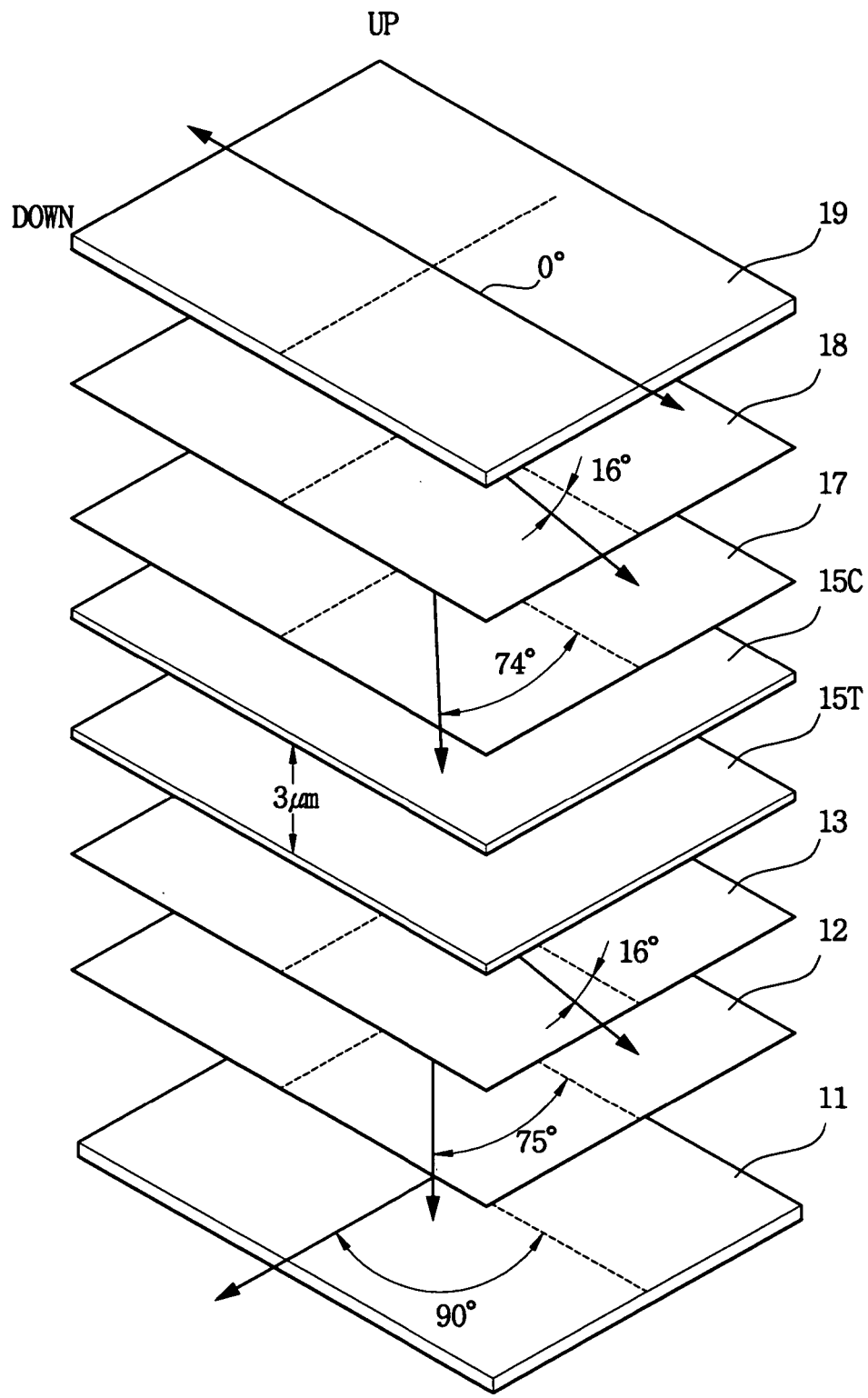
FIG. 3 is an exploded perspective view showing a transmissive-reflective type LCD apparatus in accordance with an exemplary embodiment of the present invention.

FIG. 3 is an exploded perspective view showing a transmissive-reflective type LCD apparatus in accordance with an exemplary embodiment of the present invention. A reference direction of an LCD panel of the LCD apparatus is a horizontal direction with respect to the LCD panel. A reference wavelength of a light is about 550 nm.

Referring to FIG. 3, the liquid crystal layer 15 (shown in FIG. 1) is disposed between an array substrate 15T and a color filter substrate 15C. An anisotropy Δn of a reflective index of the liquid crystal layer 15 is about 0.078 ZSM5342 with reference to a light having a wavelength of about 589 nm. The 'ZSM5342' is a unit of the anisotropy Δn of the reflective index. A thickness d1 of the liquid crystal layer 15 is about 3.0 μm. A twist angle of the liquid crystal layer 15 is about 72 degree. A viewing angle of the liquid crystal layer 15 is about 8 degree. A direction of a major axis of a liquid crystal of the liquid crystal layer 15, and the liquid crystal is disposed adjacent to the lower substrate may be the reference direction. The upper λ/4 retardation film 17 is disposed on the color filter substrate 15C. A second optical characteristics Δnd2 of the upper λ/4 retardation film 17 is about 140 nm with reference to a reference light whose wavelength is about 550 nm. A slow axis of the upper λ/4 retardation film 17 forms at an angle of about 74 degree with respect to the reference direction in a clockwise direction. A velocity of the light that passes through the upper λ/4 retardation film 17 along the slow axis is slower than that of the light that passes through the upper λ/4 retardation film 17 along a fast axis. The upper λ/2 retardation film 18 is disposed on the upper λ/4 retardation film 17. A third optical characteristics Δnd3 of the upper λ/2 retardation film 18 is about 260 nm with reference to the reference light whose wavelength is about 550 nm. A slow axis of the upper λ/2 retardation film 18 forms at an angle of about 156 degree to about 176 degree with respect to the reference direction in a clockwise direction. The upper polarizer 19 is disposed on the upper λ/2 retardation film 18. An absorption axis of the upper polarizer 19 forms at an angle of about 140 degree to about 160 degree with respect to the reference direction of the LCD panel in the clockwise direction.

The lower λ/4 retardation film 13 is disposed under the array substrate 15T. A fourth optical characteristics Δnd4 of the lower λ/4 retardation film 13 is about 145 nm with respect to the reference wavelength. A slow axis of the lower λ/4 retardation film 13 forms at an angle of about 46 degree with respect to the reference direction in the clockwise direction. The lower λ/2 retardation film 12 is disposed under the lower λ/4 retardation film 13. A fifth optical characteristics Δnd5 of the lower λ/2 retardation film 12 is about 270 nm with respect to the reference wavelength. A slow axis of the lower λ/2 retardation film 12 forms at an angle of about 105 degree with respect to the reference direction in the clockwise direction. The lower polarizer 11 is disposed under the lower λ/2 retardation film 12. An absorption axis of the lower polarizer 11 forms at an angle of about 120 degree with respect to the reference direction in the clockwise direction.

Figure 4:
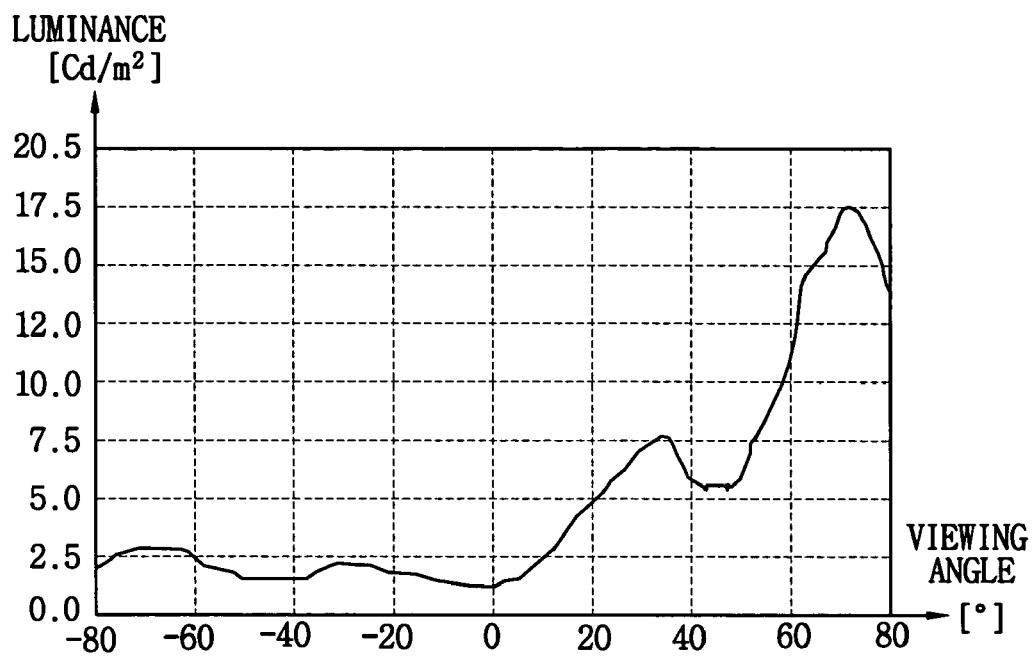
FIG. 4 is a graph showing a relationship between a luminance and a viewing angle when the LCD apparatus shown in FIG. 3 displays black color.
Figure 5:
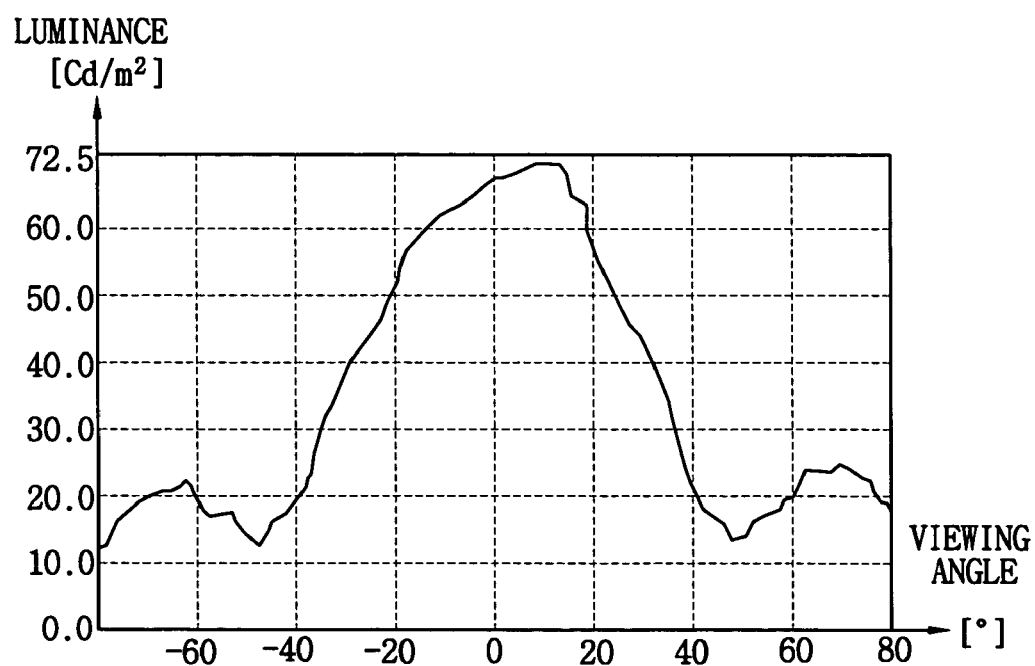
FIG. 5 is a graph showing a relationship between a luminance and a viewing angle when the LCD apparatus shown in FIG. 3 displays white color.
Figure 6:
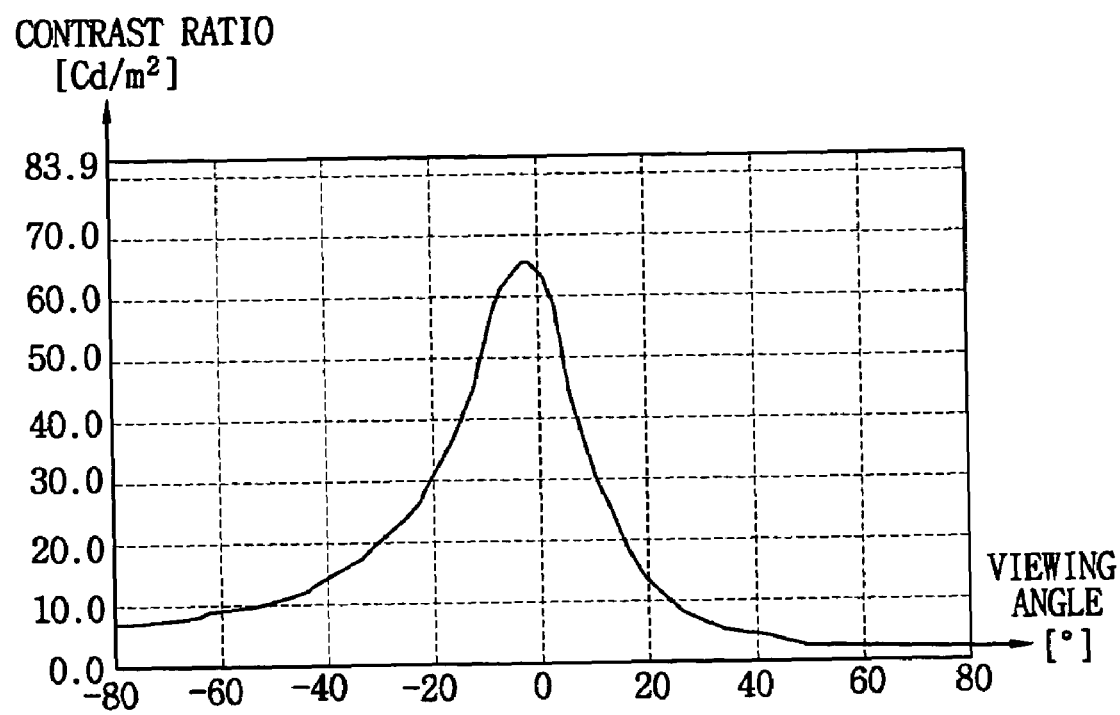
FIG. 6 is a graph showing a relationship between a contrast ratio and a viewing angle of the LCD apparatus shown in FIG. 3.

FIG. 4 is a graph showing a relationship between a luminance and a viewing angle when the LCD apparatus shown in FIG. 3 displays black color. FIG. 5 is a graph showing a relationship between a luminance and a viewing angle when the LCD apparatus shown in FIG. 3 displays white color. FIG. 6 is a graph showing a relationship between a contrast ratio and a viewing angle of the LCD apparatus shown in FIG. 3.

Referring to FIG. 4, the black color is displayed in a direction at an angle of about 90 degree with respect to the reference direction in the clockwise direction. The black color is not displayed in a direction at an angle of about 90 degree with respect to the reference direction in a counter-clockwise direction. In particular, the white color having a luminance of about 17.5 [Cd/m$^3$] is displayed in a direction at an angle of about 60 degree to about 80 degree with respect to the reference direction in the counter-clockwise direction.

Referring to FIG. 5, the white color is displayed in a direction substantially perpendicular to the reference direction.

Referring to FIG. 6, an image having high contrast ratio is displayed at an angle of about 90 degree with respect to the reference direction so that a contrast ratio of an upper portion of the LCD panel is different from that of a lower portion of the LCD panel.

Therefore, the display quality of the transmissive-reflective LCD apparatus having a unit cell-gap may be deteriorated.

Figure 7:
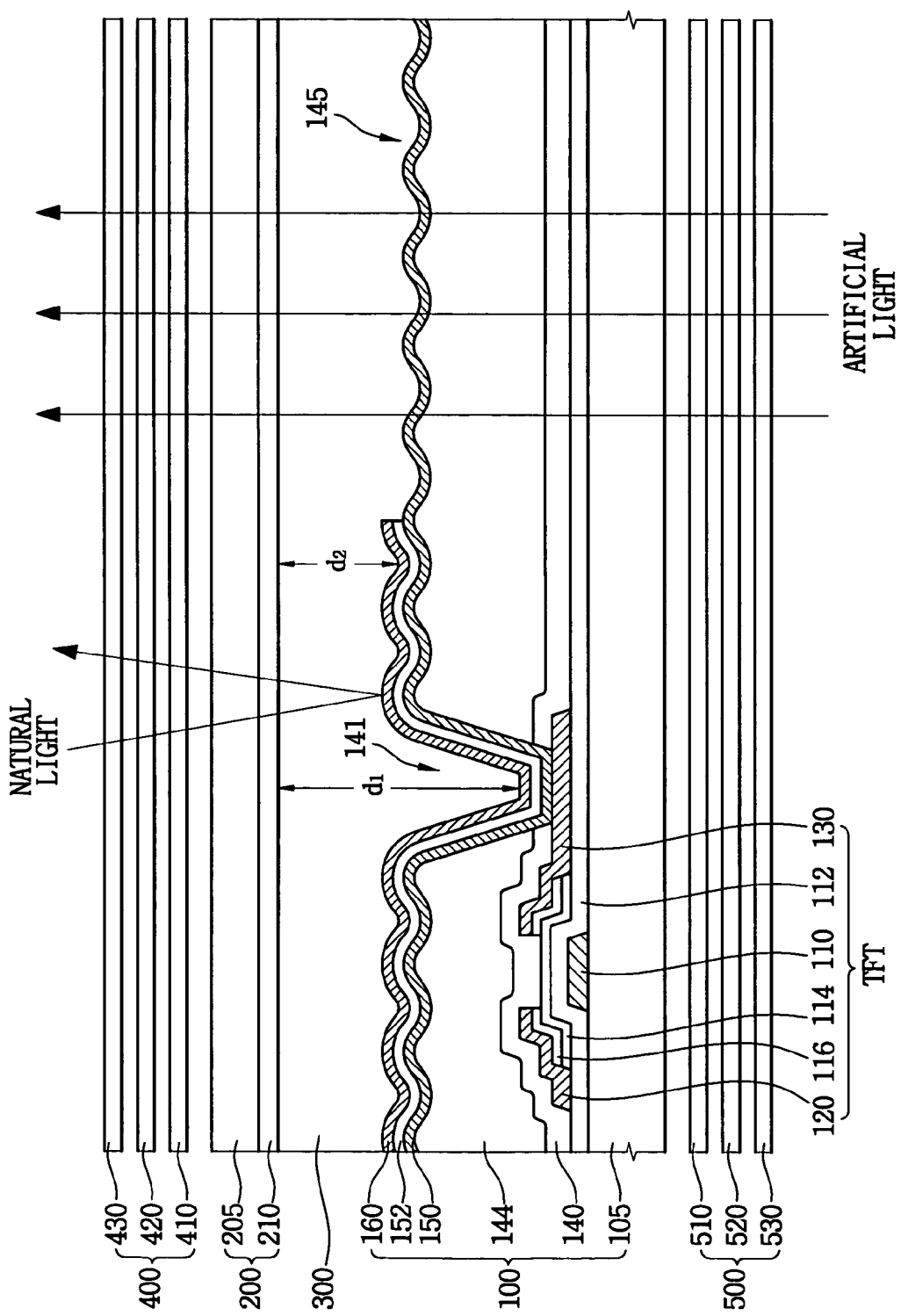
FIG. 7 is a cross-sectional view showing an LCD apparatus in accordance with another exemplary embodiment of the present invention.

FIG. 7 is a cross-sectional view showing an LCD apparatus in accordance with another exemplary embodiment of the present invention. The LCD apparatus includes a transmissive-reflective LCD apparatus having a unit cell-gap and a top indium tin oxide (ITO) type.

Referring to FIG. 7, the LCD apparatus includes an array substrate 100, a color filter substrate 200, a liquid crystal layer 300, an upper optical film assembly 400 and a lower optical film assembly 500. The liquid crystal layer 300 is disposed between the array substrate 100 and the color filter substrate 200. The upper optical film assembly 400 is disposed on the color filter substrate 200. The lower optical film assembly 500 is disposed under the array substrate 100.

The array substrate 100 includes a first transparent plate 105, a switching element that includes a thin film transistor (TFT), a passivation layer 140 and an organic insulating layer 144. The switching element is formed on the first transparent plate 105. The switching element includes a gate electrode 110, a gate insulating layer 112 that is formed on the first transparent plate 105 having the gate electrode 110, a semiconductor layer 114, an ohmic contact layer 116, a source electrode 120 and a drain electrode 130. The passivation layer 140 is formed on the first transparent plate 105 having the switching element. The passivation layer 140 includes a first opening, through which the drain electrode 130 is partially exposed. The organic insulating layer 144 is formed on the passivation layer 140. The organic insulating layer 144 has a second opening, through which the drain electrode 130 is partially exposed. The second opening is disposed on the first opening. The first and second openings form a first contact hole 141. Convex and concave portions may be formed on the organic insulating layer 144 to improve a reflective index of a reflecting plate 160.

The array substrate 100 further includes a pixel electrode 150, an insulating interlayer 152 and the reflecting plate 160. The pixel electrode 150 is electrically connected to the drain electrode 130 through the first contact hole 141. The switching element is formed on a portion of the pixel electrode 130, which corresponds to the switching element. The reflecting plate 160 is formed on the insulating interlayer 152. The array substrate 100 further includes a reflection region and a transmission window 145. The reflecting plate 160 is disposed in the reflection region. The reflecting plate 160 defines the transmission window 145.

The pixel electrode 150 includes a transparent conductive material, for example, such as indium tin oxide (ITO), tin oxide (TO), indium zinc oxide (IZO), zinc oxide (ZO), etc. A capacitor line is formed at a position spaced apart from the switching element to form a storage capacitor (Cst, not shown). The capacitor line is disposed under the pixel electrode 150.

The reflecting plate 160 is formed on the insulating interlayer 152 corresponding to the reflection region. The reflecting plate 160 is electrically insulated from the pixel electrode 150 by the insulating interlayer 152. Alternatively, a portion of the insulating interlayer 152 is removed so that the reflecting plate 160 is electrically connected to the pixel electrode 150. In addition, the insulating interlayer 152 may be omitted, and a conductive layer (not shown) may be disposed between the reflecting plate 160 and the pixel electrode 150.

The color filter substrate 200 includes a second transparent plate 205, a black matrix (not shown), a color filter 210 and an overcoating layer (not shown). The black matrix is formed on the second transparent plate 205 to define red (R), green (G) and blue (B) pixel regions. The color filter 210 is formed in the red (R), green (G) and the blue (B) pixel regions. The overcoating layer is coated on the second transparent plate 205 having the black matrix and the color filter 210 to protect the black matrix and the color filter 210. Alternatively, portions of the color filter 210 may be overlapped with one another to form the black matrix. A common electrode (not shown) may also be formed on the overcoating layer.

The liquid crystal layer 300 is formed between the array substrate 100 and the color filter substrate 200. A liquid crystal of the liquid crystal layer 300 varies an arrangement in response to an electric field applied between the pixel electrode 150 of the array substrate 100 and the common electrode of the color filter substrate 200, and thus a light transmittance of a natural light that passes through the color filter substrate 200 or an artificial light that passes through the transmission window 145 may be changed. A direction of a major axis of a liquid crystal of the liquid crystal layer 300, which is disposed adjacent to the lower substrate, may be the reference direction.

The liquid crystal layer 300 may have a homogeneous alignment mode. When the liquid crystal layer 300 has the homogeneous alignment mode, a twist angle of the liquid crystal layer 300 is about 0 degree.

The array substrate 100 may include a first alignment layer (not shown) so that the first alignment layer is rubbed in a first rubbing direction that is in substantially parallel with a horizontal direction. The color filter substrate 200 may also include a second alignment layer (not shown) so that the second alignment layer is rubbed in a second rubbing direction that is in substantially opposite to the first rubbing direction. Alternatively, the second alignment layer may be rubbed in a second rubbing direction that is in substantially parallel with the horizontal direction, and the first alignment layer may be rubbed in a first rubbing direction that is in substantially opposite to the second rubbing direction.

In this exemplary embodiment, the array substrate 100 includes the pixel electrode 150, and the color filter substrate 200 includes the common electrode. Alternatively, the LCD apparatus may include a coplanar electrode (CE) mode, for example, such as an in-plane switching (IPS) mode, a fringe field switching (FFS) mode, etc., so that the color filter substrate 200 includes the common electrode.

In this exemplary embodiment, the LCD apparatus includes the transmissive-reflective LCD apparatus. Alternatively, the LCD apparatus may include a reflective type LCD apparatus having a switching element, a pixel electrode that is electrically connected to a drain electrode of the switching element and a reflecting plate that is formed on the pixel electrode to reflect the natural light.

In this exemplary embodiment, the LCD apparatus includes the top indium tin oxide (ITO) type. Alternatively, the LCD apparatus may include a bottom ITO type. A pixel electrode of the bottom ITO type LCD apparatus is formed under the organic insulating layer.

The upper optical film assembly 400 includes an upper λ/4 retardation film 410 disposed on the color filter substrate 200, an upper λ/2 retardation film 420 disposed on the upper λ/4 retardation film 410 and an upper polarizer 430 disposed on the upper λ/2 retardation film 420. The lower optical film assembly 500 includes a lower λ/4 retardation film 510 disposed under the array substrate 100, a lower λ/2 retardation film disposed under the lower λ/4 retardation film and a lower polarizer 530 disposed under the lower λ/2 retardation film 520.

A reference direction is in substantially parallel with the horizontal direction. A reference wavelength of the LCD apparatus is about 550 nm. A velocity of a light that passes through a retardation film along a slow axis is slower than that of a light that passes through the retardation film along a fast axis.

Figure 8:
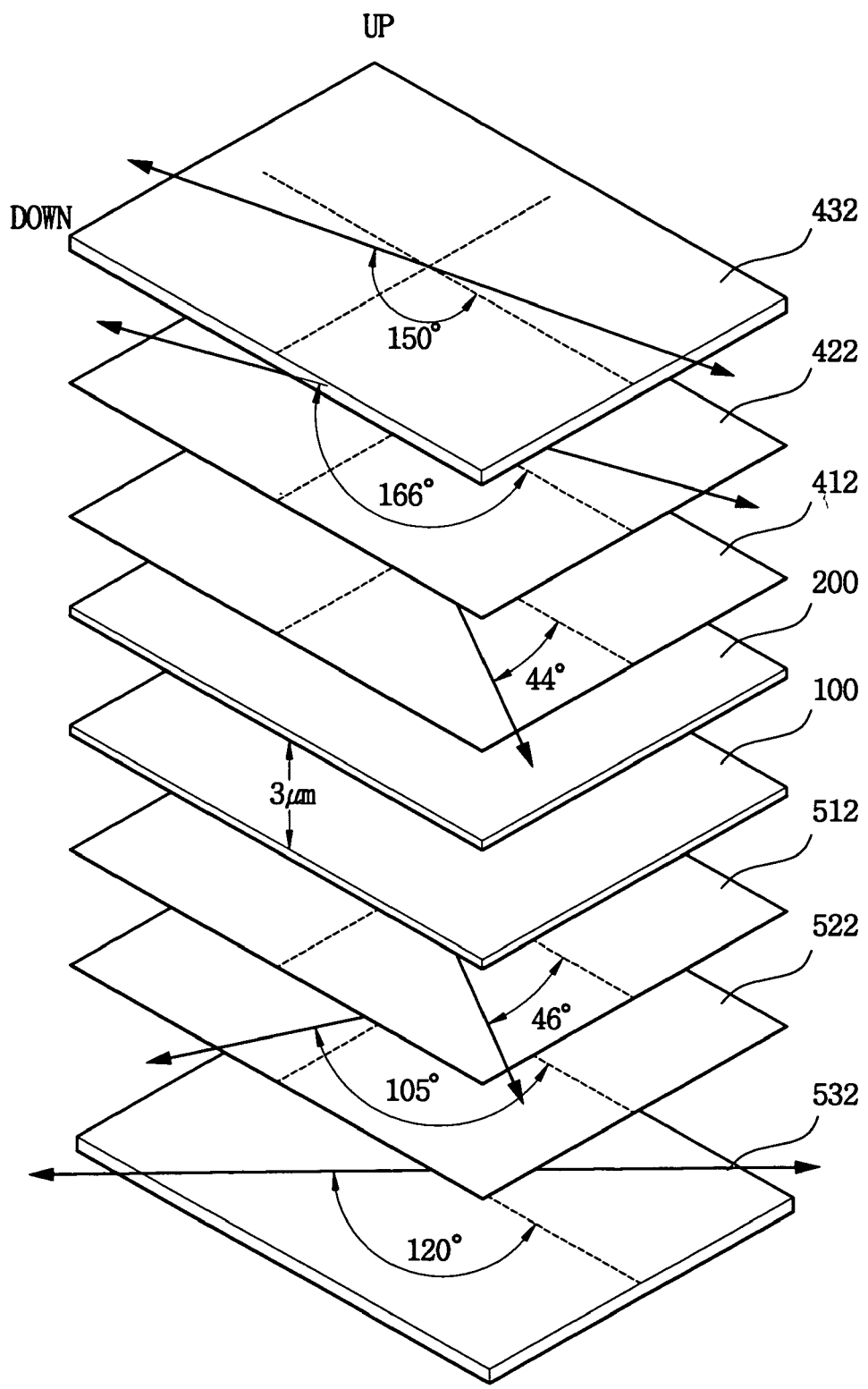
FIG. 8 is an exploded perspective view showing an LCD apparatus in accordance with another exemplary embodiment of the present invention.

FIG. 8 is an exploded perspective view showing an LCD apparatus in accordance with another exemplary embodiment of the present invention. Referring to FIG. 8 in which the same reference numerals denote the same elements as in FIG. 3, and thus any further detailed descriptions concerning the same elements will be omitted. A reference direction is in substantially parallel with a horizontal direction of an LCD panel of the LCD apparatus.

Referring to FIG. 8, the liquid crystal layer is disposed between an array substrate 100 and a color filter substrate 200. An anisotropy Δn of a reflective index of the liquid crystal layer is about 0.078 ZSM5342 with reference to a light having a wavelength of about 589 nm. The 'ZSM5342' is a unit of the anisotropy Δn of the reflective index. A thickness d1 of the liquid crystal layer 15 is about 3.0 μm. A twist angle of the liquid crystal layer is about 72 degree. A viewing angle of the liquid crystal layer is about 12 degree.

The upper λ/4 retardation film 412 is disposed on the color filter substrate 200. A second optical characteristics Δnd2 of the upper λ/4 retardation film 412 is about 130 nm to about 150 nm with reference to a reference light whose wavelength is about 550 nm. A slow axis of the upper λ/4 retardation film 412 forms at an angle of about 34 degree to about 54 degree with respect to the reference direction in a clockwise direction.

The upper λ/2 retardation film 422 is disposed on the upper λ/4 retardation film 412. A third optical characteristics Δnd3 of the upper λ/2 retardation film 422 is about 250 nm to about 270 nm with reference to the reference light whose wavelength is about 550 nm. A slow axis of the upper λ/2 retardation film 422 forms at an angle of about 156 degree to about 176 degree with respect to the reference direction in a clockwise direction.

The upper polarizer 432 is disposed on the upper λ/2 retardation film 422. An absorption axis of the upper polarizer 432 forms at an angle of about 140 degree to about 160 degree with respect to the reference direction of the LCD panel in the clockwise direction.

The lower λ/4 retardation film 512 is disposed under the array substrate 100. A fourth optical characteristics Δnd4 of the lower λ/4 retardation film 512 is about 135 nm to about 155 nm with respect to the reference wavelength. A slow axis of the lower λ/4 retardation film 512 forms at an angle of about 36 degree to about 56 degree with respect to the reference direction in the clockwise direction.

The lower λ/2 retardation film 522 is disposed under the lower λ/4 retardation film 512. A fifth optical characteristics Δnd5 of the lower λ/2 retardation film 522 is about 260 nm to about 280 nm with respect to the reference wavelength. A slow axis of the lower λ/2 retardation film 522 forms at an angle of about 95 degree to about 115 degree with respect to the reference direction in the clockwise direction.

The lower polarizer 532 is disposed under the lower λ/2 retardation film 522. An absorption axis of the lower polarizer 532 forms at an angle of about 110 degree to about 130 degree with respect to the reference direction in the clockwise direction.

In another exemplary embodiment, a slow axis of a lower λ/4 retardation film may form at an angle of about 124 degree to about 144 degree with respect to the reference direction in the clockwise direction. A slow axis of a lower λ/2 retardation film may form at an angle of about 65 degree to about 85 degree with respect to the reference direction in the clockwise direction. An absorption axis of a lower polarizer may form at an angle of about 50 degree to about 70 degree with respect to the reference direction in the clockwise direction.

A light transmittance of the LCD apparatus in this exemplary embodiment is about 0.2373, and a contrast ratio of a transmission mode of the LCD apparatus in this exemplary embodiment is about 911. The light transmittance of the LCD apparatus in this exemplary embodiment is increased by about 20% than that of the LCD apparatus shown in FIG. 3. The contrast ratio of the transmission mode of the LCD apparatus in this exemplary embodiment is substantially the same as that of the LCD apparatus shown in FIG. 3.

A light reflectivity of the LCD apparatus in this exemplary embodiment is about 8%, and is substantially the same as that of the LCD apparatus shown in FIG. 3. A contrast ratio of the reflection mode of the LCD apparatus in this exemplary embodiment is about 30, and is substantially the same as that of the LCD apparatus shown in FIG. 3. A light reflectivity of an integrating sphere of the LCD apparatus in this exemplary embodiment is about 5%, and is substantially the same as that of the LCD apparatus shown in FIG. 3. A contrast ratio of the integrating sphere of the LCD apparatus in this exemplary embodiment is about 10, and is substantially the same as that of the LCD apparatus shown in FIG. 3.

A luminance viewed in front of the LCD panel in this exemplary embodiment is about 70 [Cd/m$^3$]. A luminance viewed in front of the LCD panel shown in FIG. 3 is about 55 [Cd/m$^3$]. The luminance viewed in front of the LCD panel in this exemplary embodiment is increased by about 25% than that of the LCD panel shown in FIG. 3. A contrast ratio viewed in front of the LCD panel in this exemplary embodiment is about 110. A contrast ratio viewed in front of the LCD panel shown in FIG. 3 is about 80. The contrast ratio viewed in front of the LCD panel in this exemplary embodiment is increased by about 12% than that of the LCD panel shown in FIG. 3. Viewing angles of an upper portion, a lower portion, a left portion and a right portion of the LCD panel in this exemplary embodiment are about 28, 28, 52 and 22, respectively. Viewing angles of an upper portion, a lower portion, a left portion and a right portion of the LCD panel shown in FIG. 3 are about 21, 36, 22 and 38, respectively. Therefore, the viewing angles are increased.

Figure 9:
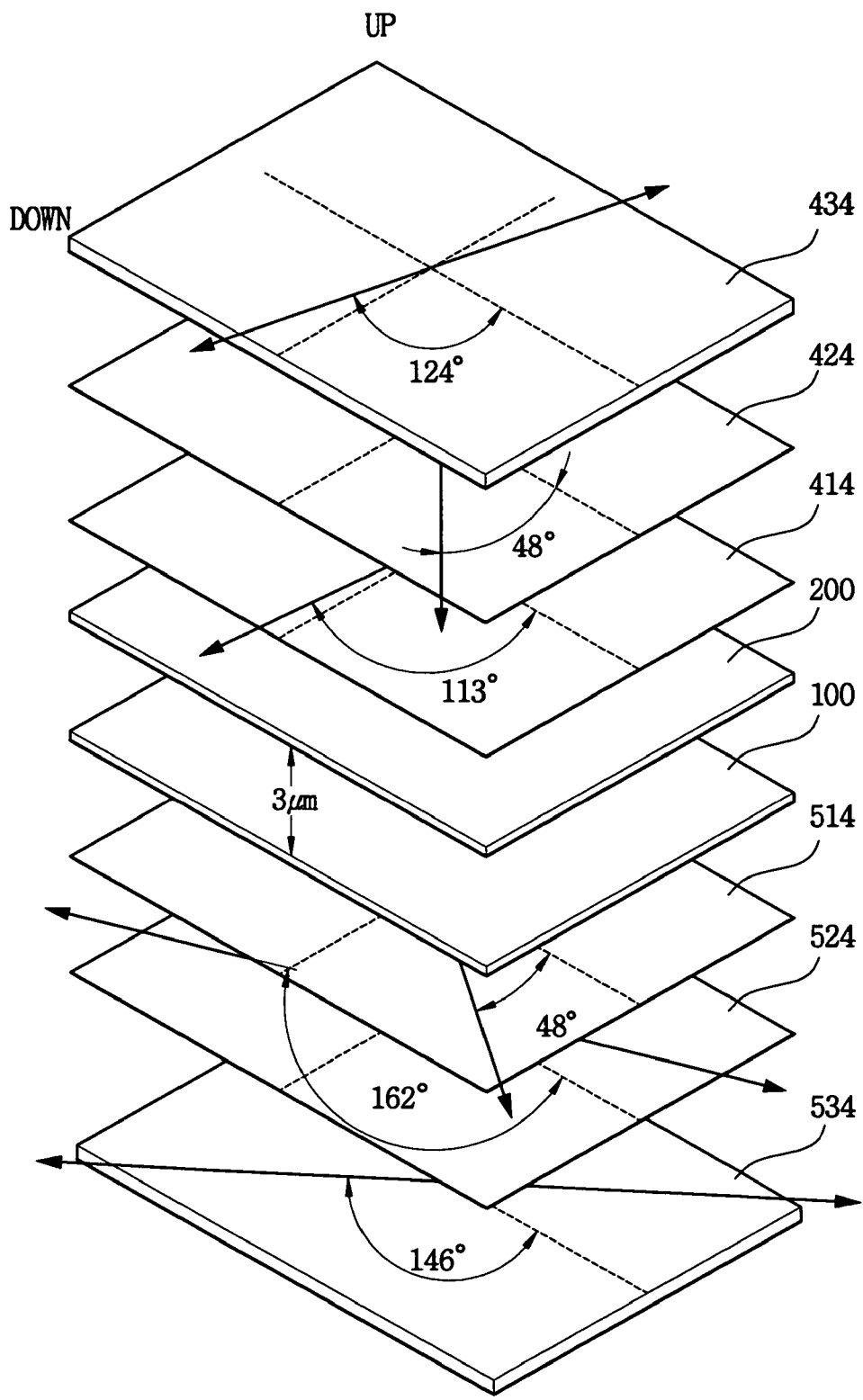
FIG. 9 is an exploded perspective view showing an LCD apparatus in accordance with another exemplary embodiment of the present invention.

FIG. 9 is an exploded perspective view showing an LCD apparatus in accordance with another exemplary embodiment of the present invention. Referring to FIG. 9 in which the same reference numerals denote the same elements in FIG. 3, and thus any further detailed descriptions concerning the same elements will be omitted. A reference direction is in substantially parallel with a horizontal direction of an LCD panel of the LCD apparatus.

Referring to FIG. 9, the liquid crystal layer is disposed between an array substrate 100 and a color filter substrate 200. An anisotropy Δn of a reflective index of the liquid crystal layer is about 0.078 ZSM5342 with reference to a light having a wavelength of about 589 nm. The 'ZSM5342' is a unit of the anisotropy Δn of the reflective index. A thickness d1 of the liquid crystal layer is about 3.0 μm. A twist angle of the liquid crystal layer is about 60 degree. A viewing angle of the liquid crystal layer is about 10 degree.

The upper λ/4 retardation film 414 is disposed on the color filter substrate 200. A second optical characteristics Δnd2 of the upper λ/4 retardation film 414 is about 130 nm to about 150 nm with reference to a reference light whose wavelength is about 550 nm. A slow axis of the upper λ/4 retardation film 414 forms at an angle of about 103 degree to about 123 degree with respect to the reference direction in a clockwise direction.

The upper λ/2 retardation film 424 is disposed on the upper λ/4 retardation film 414. A third optical characteristics Δnd3 of the upper λ/2 retardation film 424 is about 250 nm to about 270 nm with reference to the reference light whose wavelength is about 550 nm. A slow axis of the upper λ/2 retardation film 424 forms at an angle of about 38 degree to about 58 degree with respect to the reference direction in a clockwise direction.

The upper polarizer 434 is disposed on the upper λ/2 retardation film 424. An absorption axis of the upper polarizer 434 forms at an angle of about 114 degree to about 134 degree with respect to the reference direction of the LCD panel in the clockwise direction.

The lower λ/4 retardation film 514 is disposed under the array substrate 100. A fourth optical characteristics Δnd4 of the lower λ/4 retardation film 514 is about 120 nm to about 140 nm with respect to the reference wavelength. A slow axis of the lower λ/4 retardation film 514 forms at an angle of about 38 degree to about 58 degree with respect to the reference direction in the clockwise direction.

The lower λ/2 retardation film 524 is disposed under the lower λ/4 retardation film 514. A fifth optical characteristics Δnd5 of the lower λ/2 retardation film 524 is about 260 nm to about 280 nm with respect to the reference wavelength. A slow axis of the lower λ/2 retardation film 524 forms at an angle of about 152 degree to about 172 degree with respect to the reference direction in the clockwise direction.

The lower polarizer 534 is disposed under the lower λ/2 retardation film 524. An absorption axis of the lower polarizer 534 forms at an angle of about 136 degree to about 156 degree with respect to the reference direction in the clockwise direction.

In another exemplary embodiment, a slow axis of a lower λ/4 retardation film may form at an angle of about 122 degree to about 142 degree with respect to the reference direction in the clockwise direction. A slow axis of a lower λ/2 retardation film may be form at an angle of about 8 degree to about 28 degree with respect to the reference direction in the clockwise direction. An absorption axis of a lower polarizer may be form at an angle of about 24 degree to about 44 degree with respect to the reference direction in the clockwise direction.

A light transmittance of the LCD apparatus in this exemplary embodiment is about 0.2838, and a contrast ratio of a transmission mode of the LCD apparatus in this exemplary embodiment is about 2247. The light transmittance of the LCD apparatus in this exemplary embodiment is increased by about 250% than that of the LCD apparatus shown in FIG. 3. The contrast ratio of the transmission mode of the LCD apparatus in this exemplary embodiment is substantially the same as that of the LCD apparatus shown in FIG. 3.

A light reflectivity of the LCD apparatus in this exemplary embodiment is about 8%, and is substantially the same as that of the LCD apparatus shown in FIG. 3. A contrast ratio of the reflection mode of the LCD apparatus in this exemplary embodiment is about 30, and is substantially the same as that of the LCD apparatus shown in FIG. 3. A light reflectivity of an integrating sphere of the LCD apparatus in this exemplary embodiment is about 5%, and is substantially the same as that of the LCD apparatus shown in FIG. 3. A contrast ratio of the integrating sphere of the LCD apparatus in this exemplary embodiment is about 10, and is substantially the same as that of the LCD apparatus shown in FIG. 3.

A luminance viewed in front of the LCD panel in this exemplary embodiment is about 85 [Cd/m$^3$]. A luminance viewed in front of the LCD panel shown in FIG. 3 is about 55 [Cd/m$^3$]. The luminance viewed in front of the LCD panel in this exemplary embodiment is increased by about 54% than that of the LCD panel shown in FIG. 3. A contrast ratio viewed in front of the LCD panel in this exemplary embodiment is about 150. A contrast ratio viewed in front of the LCD panel shown in FIG. 3 is about 80. The contrast ratio viewed in front of the LCD panel in this exemplary embodiment is increased by about 180% than that of the LCD panel shown in FIG. 3. Viewing angles of an upper portion, a lower portion, a left portion and a right portion of the LCD panel in this exemplary embodiment are about 44, 42, 36 and 40, respectively. Viewing angles of an upper portion, a lower portion, a left portion and a right portion of the LCD panel shown in FIG. 3 are about 21, 36, 22 and 38, respectively. Therefore, the viewing angles are increased.

Figure 10:
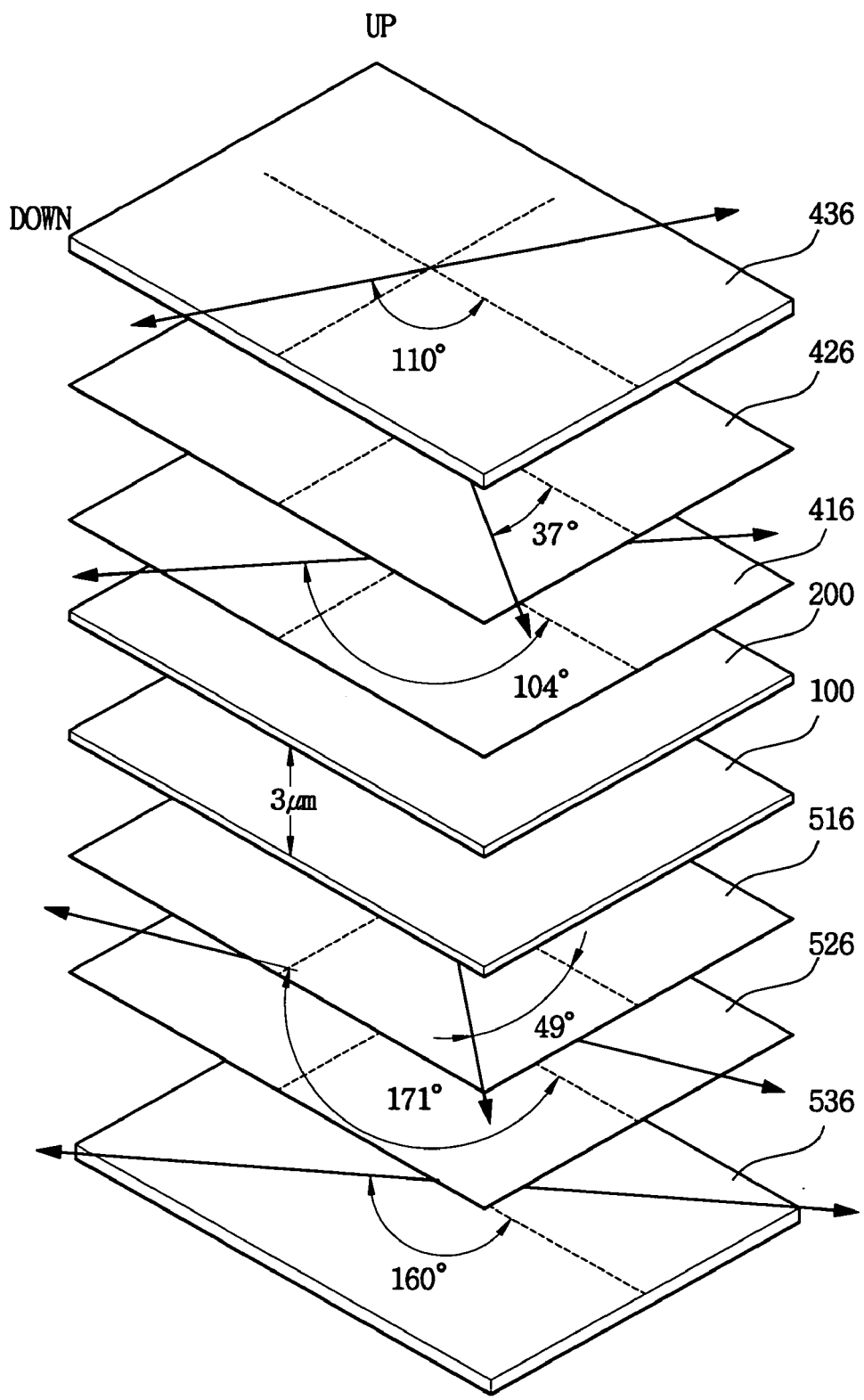
FIG. 10 is an exploded perspective view showing an LCD apparatus in accordance with another exemplary embodiment of the present invention.

FIG. 10 is an exploded perspective view showing an LCD apparatus in accordance with another exemplary embodiment of the present invention. Referring to FIG. 10 in which the same reference numerals denote the same elements in FIG. 3, and thus any further detailed descriptions concerning the same elements will be omitted. A reference direction is in substantially parallel with a horizontal direction of an LCD panel of the LCD apparatus.

Referring to FIG. 10, the liquid crystal layer is disposed between an array substrate 100 and a color filter substrate 200. An anisotropy Δn of a reflective index of the liquid crystal layer is about 0.078 ZSM5342 with reference to a light having a wavelength of about 589 nm. The 'ZSM5342' is a unit of the anisotropy Δn of the reflective index. A thickness d1 of the liquid crystal layer is about 3.0 μm. A twist angle of the liquid crystal layer is about 60 degree. A viewing angle of the liquid crystal layer is about 10 degree.

The upper λ/4 retardation film 416 is disposed on the color filter substrate 200. A second optical characteristics Δnd2 of the upper λ/4 retardation film 416 is about 130 nm to about 150 nm with reference to a reference light whose wavelength is about 550 nm. A slow axis of the upper λ/4 retardation film 416 forms at an angle of about 94 degree to about 114 degree with respect to the reference direction in a clockwise direction.

The upper λ/2 retardation film 426 is disposed on the upper λ/4 retardation film 416. A third optical characteristics Δnd3 of the upper λ/2 retardation film 426 is about 250 nm to about 270 nm with reference to the reference light whose wavelength is about 550 nm. A slow axis of the upper λ/2 retardation film 426 forms at an angle of about 27 degree to about 47 degree with respect to the reference direction in a clockwise direction.

The upper polarizer 436 is disposed on the upper λ/2 retardation film 426. An absorption axis of the upper polarizer 436 forms at an angle of about 100 degree to about 120 degree with respect to the reference direction of the LCD panel in the clockwise direction.

The lower λ/4 retardation film 516 is disposed under the array substrate 100. A fourth optical characteristics Δnd4 of the lower λ/4 retardation film 516 is about 120 nm to about 140 nm with respect to the reference wavelength. A slow axis of the lower λ/4 retardation film 516 forms at an angle of about 39 degree to about 59 degree with respect to the reference direction in the clockwise direction.

The lower λ/2 retardation film 526 is disposed under the lower λ/4 retardation film 516. A fifth optical characteristics Δnd5 of the lower λ/2 retardation film 526 is about 260 nm to about 280 nm with respect to the reference wavelength. A slow axis of the lower λ/2 retardation film 526 forms at an angle of about 161 degree to about 181 degree with respect to the reference direction in the clockwise direction.

The lower polarizer 536 is disposed under the lower λ/2 retardation film 526. An absorption axis of the lower polarizer 536 forms at an angle of about 150 degree to about 170 degree with respect to the reference direction in the clockwise direction.

In another exemplary embodiment, a slow axis of a lower λ/4 retardation film may form at an angle of about 121 degree to about 141 degree with respect to the reference direction in the clockwise direction. A slow axis of a lower λ/2 retardation film may form at an angle of about −1 degree to about 19 degree with respect to the reference direction in the clockwise direction. An absorption axis of a lower polarizer may form at an angle of about 10 degree to about 30 degree with respect to the reference direction in the clockwise direction.

A light transmittance of the LCD apparatus in this exemplary embodiment is about 0.2658, and a contrast ratio of a transmission mode of the LCD apparatus in this exemplary embodiment is about 4158. The light transmittance of the LCD apparatus in this exemplary embodiment is increased by about 35% than that of the LCD apparatus shown in FIG. 3. The contrast ratio of the transmission mode of the LCD apparatus in this exemplary embodiment is increased by about 460% than that of the LCD apparatus shown in FIG. 3.

A light reflectivity of the LCD apparatus in this exemplary embodiment is about 8%, and is substantially the same as that of the LCD apparatus shown in FIG. 3. A contrast ratio of the reflection mode of the LCD apparatus in this exemplary embodiment is about 30, and is substantially the same as that of the LCD apparatus shown in FIG. 3. A light reflectivity of an integrating sphere of the LCD apparatus in this exemplary embodiment is about 5%, and is substantially the same as that of the LCD apparatus shown in FIG. 3. A contrast ratio of the integrating sphere of the LCD apparatus in this exemplary embodiment is about 10, and is substantially the same as that of the LCD apparatus shown in FIG. 3.

A luminance viewed in front of the LCD panel in this exemplary embodiment is about 77 [Cd/m$^3$]. A luminance viewed in front of the LCD panel shown in FIG. 3 is about 55 [Cd/m$^3$]. The luminance viewed in front of the LCD panel in this exemplary embodiment is increased by about 40% than that of the LCD panel shown in FIG. 3. A contrast ratio viewed in front of the LCD panel in this exemplary embodiment is about 190. A contrast ratio viewed in front of the LCD panel shown in FIG. 3 is about 80. The contrast ratio viewed in front of the LCD panel in this exemplary embodiment is increased by about 230% than that of the LCD panel shown in FIG. 3. Viewing angles of an upper portion, a lower portion, a left portion and a right portion of the LCD panel in this exemplary embodiment are about 44, 42, 36 and 40, respectively. Viewing angles of an upper portion, a lower portion, a left portion and a right portion of the LCD panel shown in FIG. 3 are about 21, 36, 22 and 38, respectively. Therefore, the viewing angles are increased.

Figure 11:
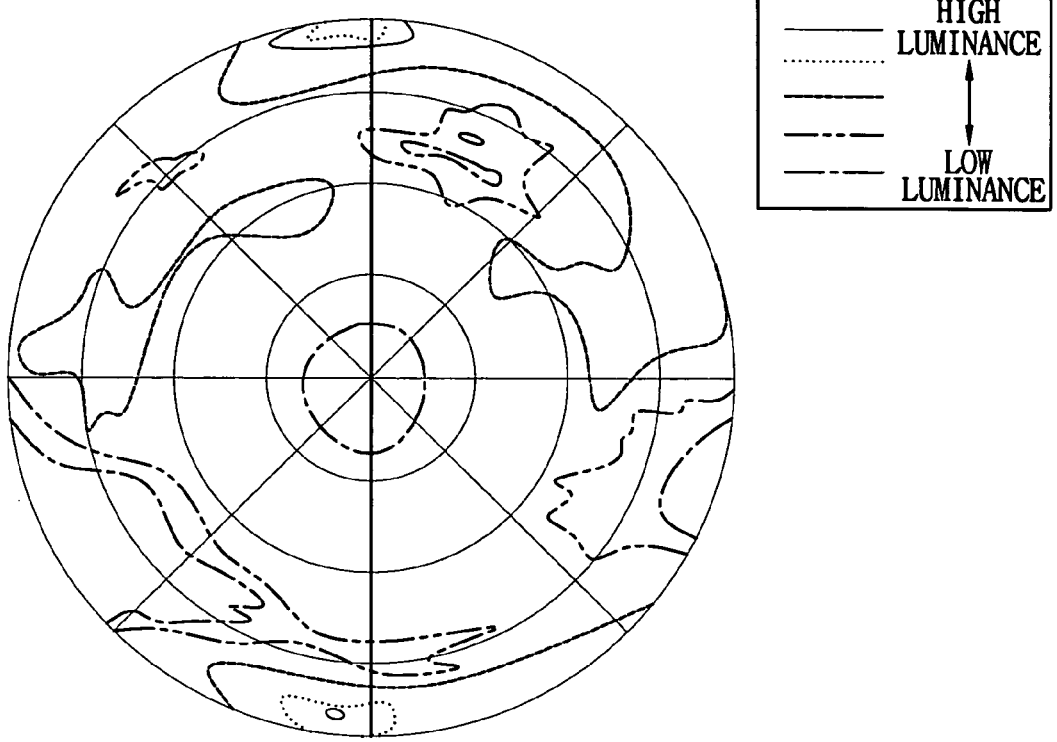
FIGS. 11 and 12 are graphs showing a relationship between a luminance and a viewing angle when an LCD apparatus in accordance with another exemplary embodiment of the present invention displays black color.
Figure 12:
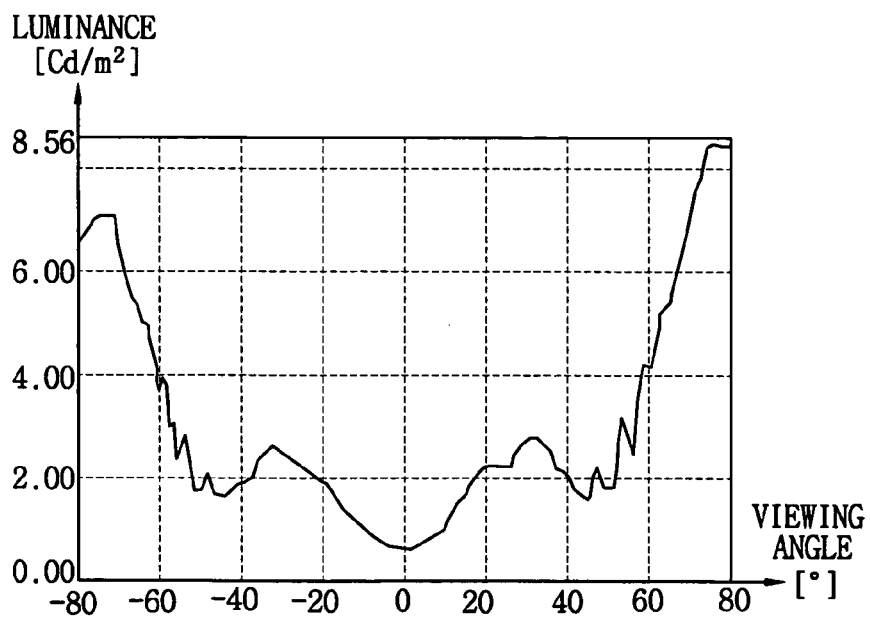

FIGS. 11 and 12 are graphs showing a relationship between a luminance and a viewing angle when an LCD apparatus in accordance with another exemplary embodiment of the present invention displays black color. Radius shown in FIG. 11 represents the viewing angle of an LCD panel of the LCD apparatus. A reference direction is in substantially parallel with a horizontal direction of the LCD panel.

A luminance of a portion of the LCD panel, which corresponds to a viewing angle between about 60 degree and about 80 degree in a direction of about 90 degree in a counter-clockwise direction, is increased. Also, a luminance of a portion of the LCD panel, which corresponds to a viewing angle of about 80 degree in a direction of about 90 degree in a clockwise direction, is increased. A luminance of remaining portion of the LCD panel is decreased to display the black color. In particular, a viewing angle viewed in front of the LCD panel is about 0.5 [Cd/m$^3$] so that an image display quality of the LCD panel is improved.

Figure 13:
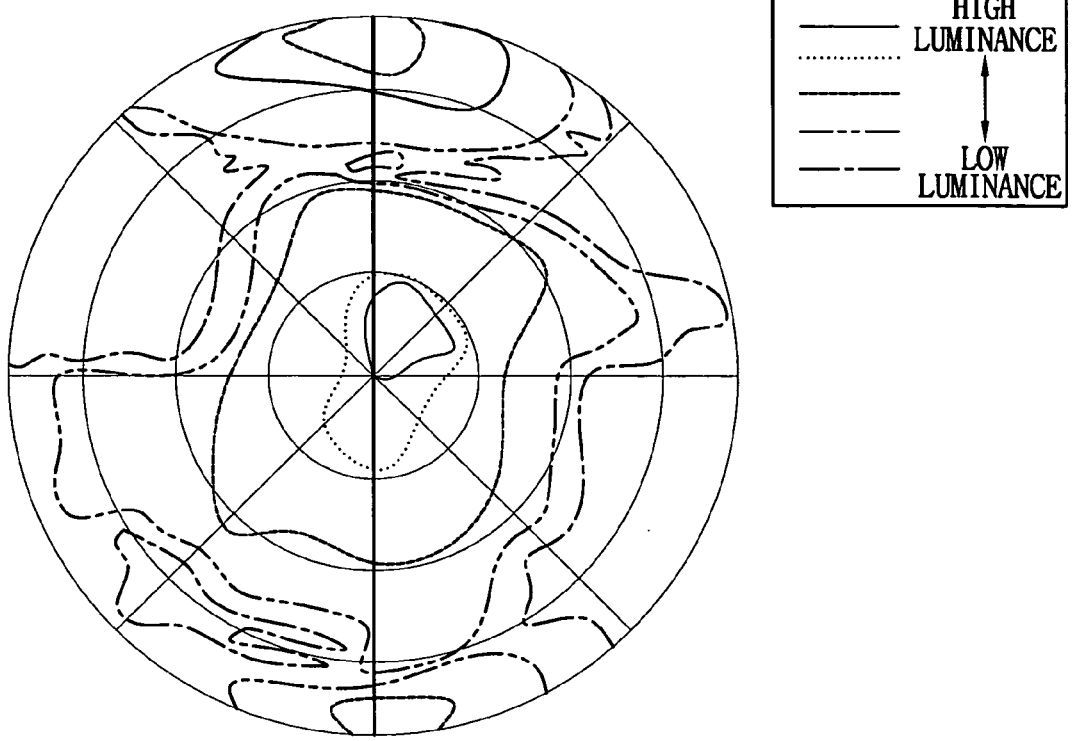
FIGS. 13 and 14 are graphs showing a relationship between a luminance and a viewing angle when an LCD apparatus in accordance with another exemplary embodiment of the present invention displays white color.
Figure 14:
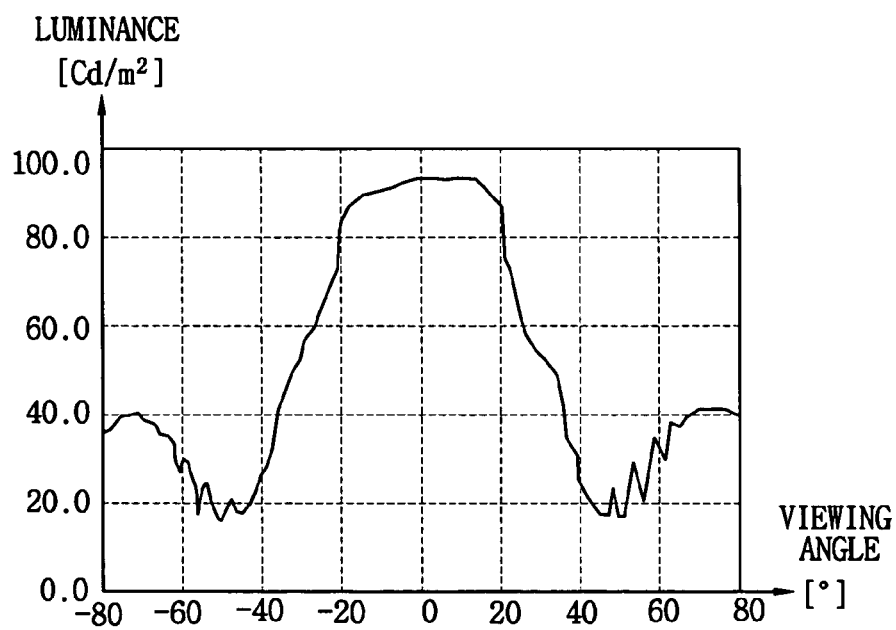

FIGS. 13 and 14 are graphs showing a relationship between a luminance and a viewing angle when an LCD apparatus in accordance with another exemplary embodiment of the present invention displays white color.

Referring to FIGS. 13 and 14, a luminance of a portion of the LCD panel, which corresponds to a viewing angle of about 0 degree to about 30 degree, is increased. A luminance viewed in front of the LCD panel is about 11 [Cd/m$^3$].

Figure 15:
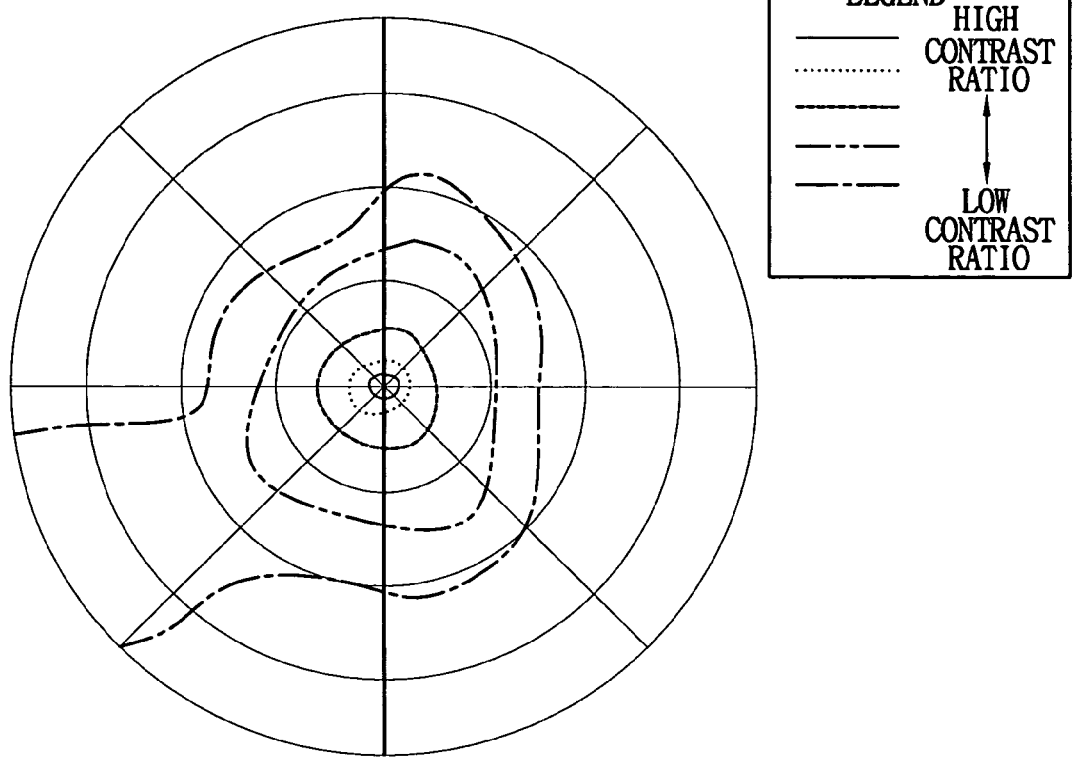
FIGS. 15 and 16 are graphs showing a relationship between a contrast ratio and a viewing angle of an LCD apparatus in accordance with another exemplary embodiment of the present invention.
Figure 16:
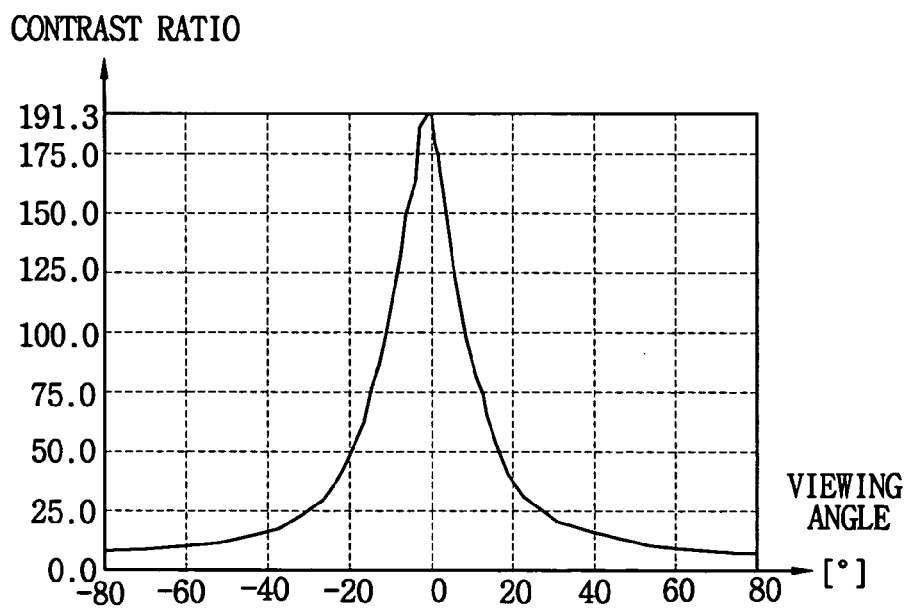

FIGS. 15 and 16 are graphs showing a relationship between a contrast ratio and a viewing angle of an LCD apparatus in accordance with another exemplary embodiment of the present invention. Radius shown in FIG. 15 represents the viewing angle of the LCD panel.

Referring to FIGS. 15 and 16, a contrast ratio of the LCD panel corresponding to a central portion is higher than that of the LCD panel corresponding to a peripheral portion to improve the image display quality of the LCD apparatus.

According to this exemplary embodiment, optical condition of the LCD apparatus is optimized so that the light transmittance and the contrast ratio of the LCD apparatus are improved. In addition, the distribution of the viewing angle and the contrast ratio of the LCD apparatus are uniformized so that a color reproductivity and the image display quality are improved.

Furthermore, the light transmittance of the LCD apparatus is increased by about 40% to about 50%, and the contrast ratio viewed in front of the LCD panel is increased by about 200%.

Figure 17:
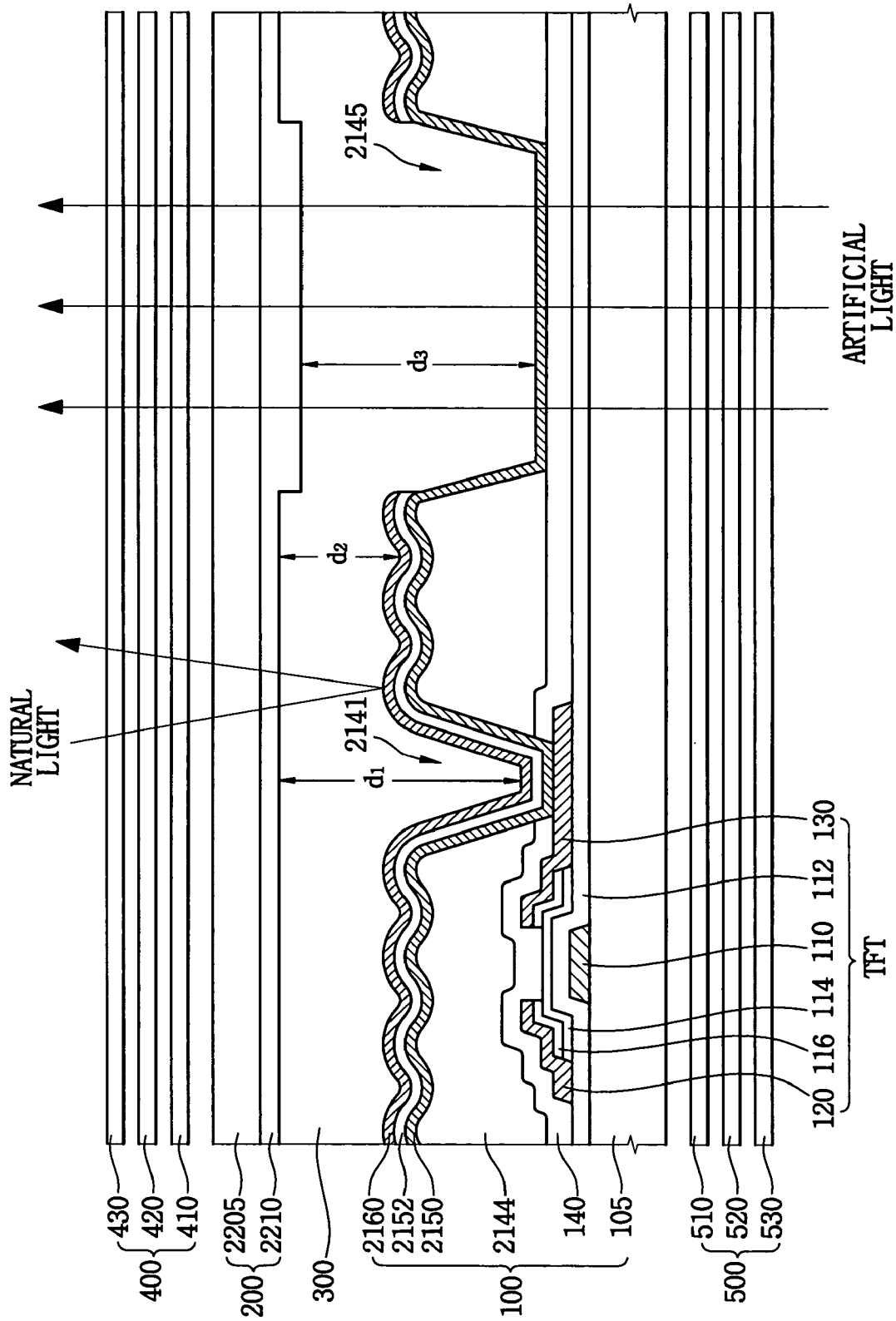
FIG. 17 is a cross-sectional view showing an LCD apparatus in accordance with another exemplary embodiment of the present invention.

FIG. 17 is a cross-sectional view showing an LCD apparatus in accordance with another exemplary embodiment of the present invention. Referring to FIG. 17 in which the same reference numerals denote the same elements in FIG. 7, and thus any further detailed descriptions concerning the same elements will be omitted. A reference direction is in substantially parallel with a horizontal direction of an LCD panel of the LCD apparatus.

Referring to FIG. 17, the LCD apparatus includes an array substrate 100, a color filter substrate 200, a liquid crystal layer 300, an upper optical film assembly 400 and a lower optical film assembly 500. The liquid crystal layer 300 is disposed between the array substrate 100 and the color filter substrate 200. The upper optical film assembly 400 is disposed on the color filter substrate 200. The lower optical film assembly 500 is disposed under the array substrate 100.

The array substrate 100 includes a first transparent plate 105, a switching element that includes a thin film transistor (TFT), a passivation layer 140 and an organic insulating layer 2144, a pixel electrode 2150, an insulating interlayer 2152 and a reflecting plate 2160. The switching element is formed on the first transparent plate 105. The switching element includes a gate electrode 110, a gate insulating layer 112 that is formed on the first transparent plate 105 having the gate electrode 110, a semiconductor layer 114, an ohmic contact layer 116, a source electrode 120 and a drain electrode 130. The passivation layer 140 is formed on the first transparent plate 105 having the switching element. The passivation layer 140 includes a first opening, through which the drain electrode 130 is partially exposed. The organic insulating layer 2144 is formed on the passivation layer 140. The organic insulating layer 2144 has a second opening, through which the drain electrode 130 is partially exposed. The second opening is disposed on the first opening. The first and second openings form a first contact hole 2141. Convex and concave portions may be formed on the organic insulating layer 2144 to improve a reflective index of a reflecting plate 2160. The pixel electrode 2150 is electrically connected to the drain electrode 130 through the first contact hole 2141. The switching element is formed on a portion of the pixel electrode 130, which corresponds to the switching element. The reflecting plate 2160 is formed on the insulating interlayer 2152. The array substrate 100 further includes a reflection region and a transmission window 2145. The reflecting plate 2160 is disposed in the reflection region. The reflecting plate 2160 defines the transmission window 2145.

The color filter substrate 200 includes a second transparent plate 2205, a black matrix (not shown), a color filter 2210 and an overcoating layer (not shown). The black matrix is formed on the second transparent plate 2205 to define red (R), green (G) and blue (B) pixel regions. The color filter 2210 is formed in the red (R), green (G) and the blue (B) pixel regions. The overcoating layer is coated on the second transparent plate 2205 having the black matrix and the color filter 2210 to protect the black matrix and the color filter 2210. A common electrode (not shown) may also be formed on the overcoating layer.

A viewing angle of the liquid crystal layer 300 is about 170 degree to about 250 degree. A twist angle of the liquid crystal layer 300 is about −10 degree to about +10 degree. The liquid crystal layer 300 is formed between the array substrate 100 and the color filter substrate 200. A liquid crystal of the liquid crystal layer 300 varies an arrangement in response to an electric field applied between the pixel electrode 2150 of the array substrate 100 and the common electrode of the color filter substrate 200, and thus a light transmittance of a natural light that passes through the color filter substrate 200 or an artificial light that passes through the transmission window 2145 may be changed.

A first thickness d1 of a portion of the liquid crystal layer 300 in the reflection region corresponding to the contact hole 2141, a second thickness d2 of a portion of the liquid crystal layer 300 in a remaining reflection region, and a third thickness d3 of a portion of the liquid crystal layer 300 corresponding to the transmission window are different from one another. The first thickness d1 is thicker than the second thickness d2. The third thickness d3 is thicker than the first thickness d1.

An anisotropy Δn of a refractive index multiplied by a thickness is equal to an optical characteristics 66 nd. A first optical characteristics Δnd1 corresponds to the portion of the liquid crystal layer 300 in the reflection region corresponding to the contact hole 2141. A second optical characteristics Δnd2 corresponds to the portion of the liquid crystal layer 300 in the remaining reflection region. A third optical characteristics Δnd3 corresponds to the portion of the liquid crystal layer 300 corresponding to the transmission window.

The second thickness d2 may be no more than 1.7 μm. The third thickness d3 may be no less than 3.3 μm. The first to third thicknesses d1, d2 and d3 may be determined by the liquid crystal of the liquid crystal layer 300, the upper optical film assembly 400 and the lower optical film assembly 500.

The liquid crystal layer 300 has a homogeneous alignment mode. When the liquid crystal layer 300 has the homogeneous alignment mode, a twist angle of the liquid crystal layer 300 is about 0 degree.

The array substrate 100 may include a first alignment layer (not shown) so that the first alignment layer is rubbed in a first rubbing direction that is in substantially parallel with a horizontal direction. The color filter substrate 200 may also include a second alignment layer (not shown) so that the second alignment layer is rubbed in a second rubbing direction that is in substantially opposite to the first rubbing direction. Alternatively, the second alignment layer may be rubbed in a second rubbing direction that is in substantially parallel with the horizontal direction, and the first alignment layer may be rubbed in a first rubbing direction that is in substantially opposite to the second rubbing direction.

In this exemplary embodiment, the array substrate 100 includes the pixel electrode 150, and the color filter substrate 200 includes the common electrode. Alternatively, the LCD apparatus may include a coplanar electrode (CE) mode, for example, such as an in-plane switching (IPS) mode, a fringe field switching (FFS) mod, etc., so that the color filter substrate 200 includes the common electrode.

The upper optical film assembly 400 includes an upper λ/4 retardation film 410 disposed on the color filter substrate 200, an upper λ/2 retardation film 420 disposed on the upper λ/4 retardation film 420 and an upper polarizer 430 disposed on the upper λ/2 retardation film 420. The lower optical film assembly 500 includes a lower λ/4 retardation film 510 disposed under the array substrate 100, a lower λ/2 retardation film 520 disposed under the lower λ/4 retardation film 510 and a lower polarizer 530 disposed under the lower λ/2 retardation film 520.

Figure 18:
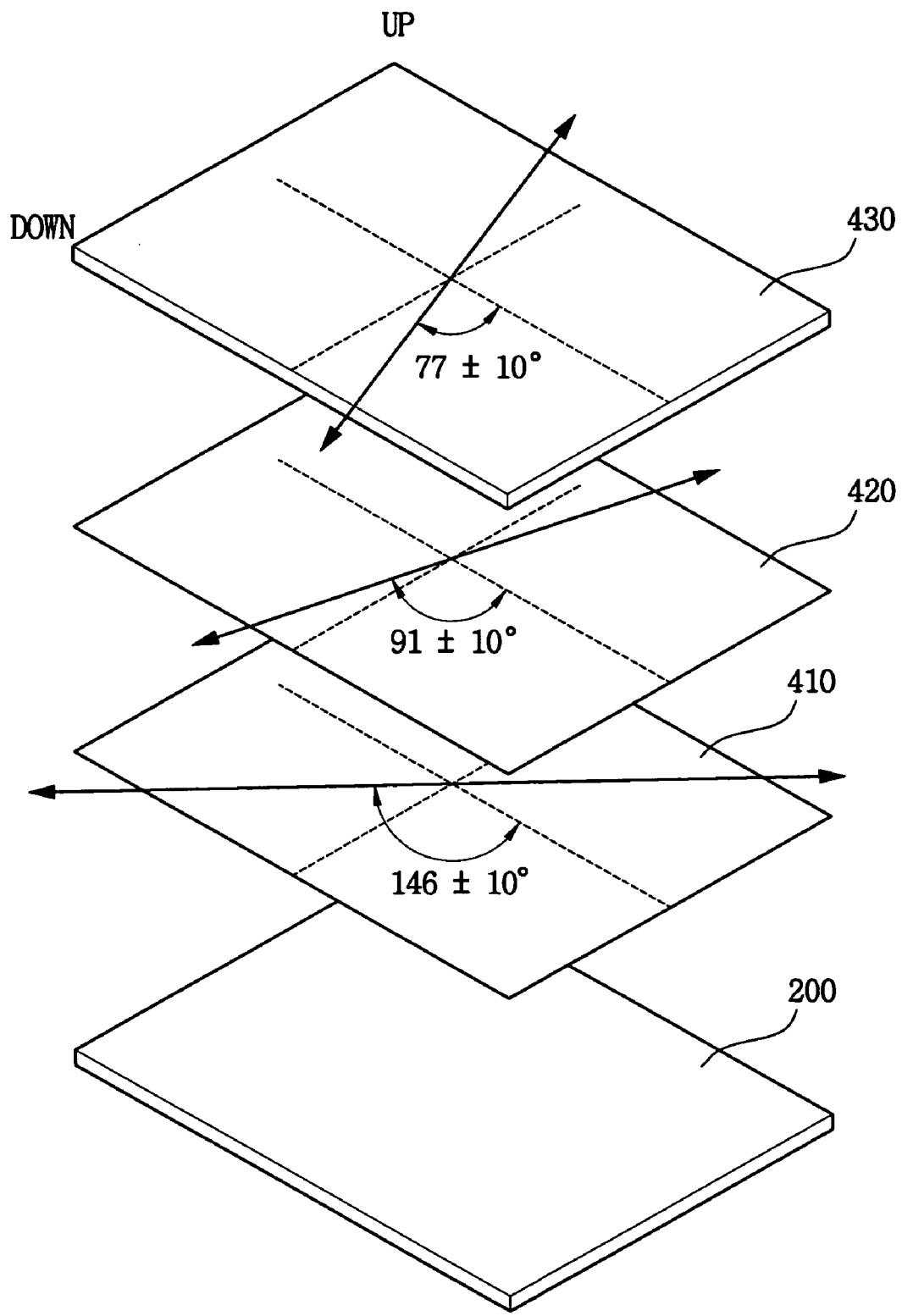
FIG. 18 is an exploded perspective view showing an upper optical film assembly of the LCD apparatus shown in FIG. 17.

FIG. 18 is an exploded perspective view showing an upper optical film assembly of the LCD apparatus shown in FIG. 17. A reference direction is in substantially parallel with a horizontal direction of an LCD panel of the LCD apparatus. A reference wavelength of a light is about 550 nm.

Referring to FIG. 18, the upper λ/4 retardation film 410 is disposed on the color filter substrate 200. The fourth optical characteristics Δnd4 of the upper λ/4 retardation film 410 is about 130 nm to about 150 nm. A slow axis of the upper λ/4 retardation film 410 forms at an angle of about 136 degree to about 156 degree with respect to the reference direction in a clockwise direction.

The upper λ/2 retardation film 420 is disposed on the upper λ/4 retardation film 410. The fifth optical characteristics Δnd5 of the upper λ/2 retardation film 420 is about 250 nm to about 270 nm. A slow axis of the upper λ/2 retardation film 420 forms at an angle of about 81 degree to about 101 degree with respect to the reference direction in a clockwise direction.

The upper polarizer 430 is disposed on the upper λ/2 retardation film 420. An absorption axis of the upper polarizer 430 forms at an angle of about 67 degree to about 87 degree with respect to the reference direction of the LCD panel in the clockwise direction.

Figure 19:
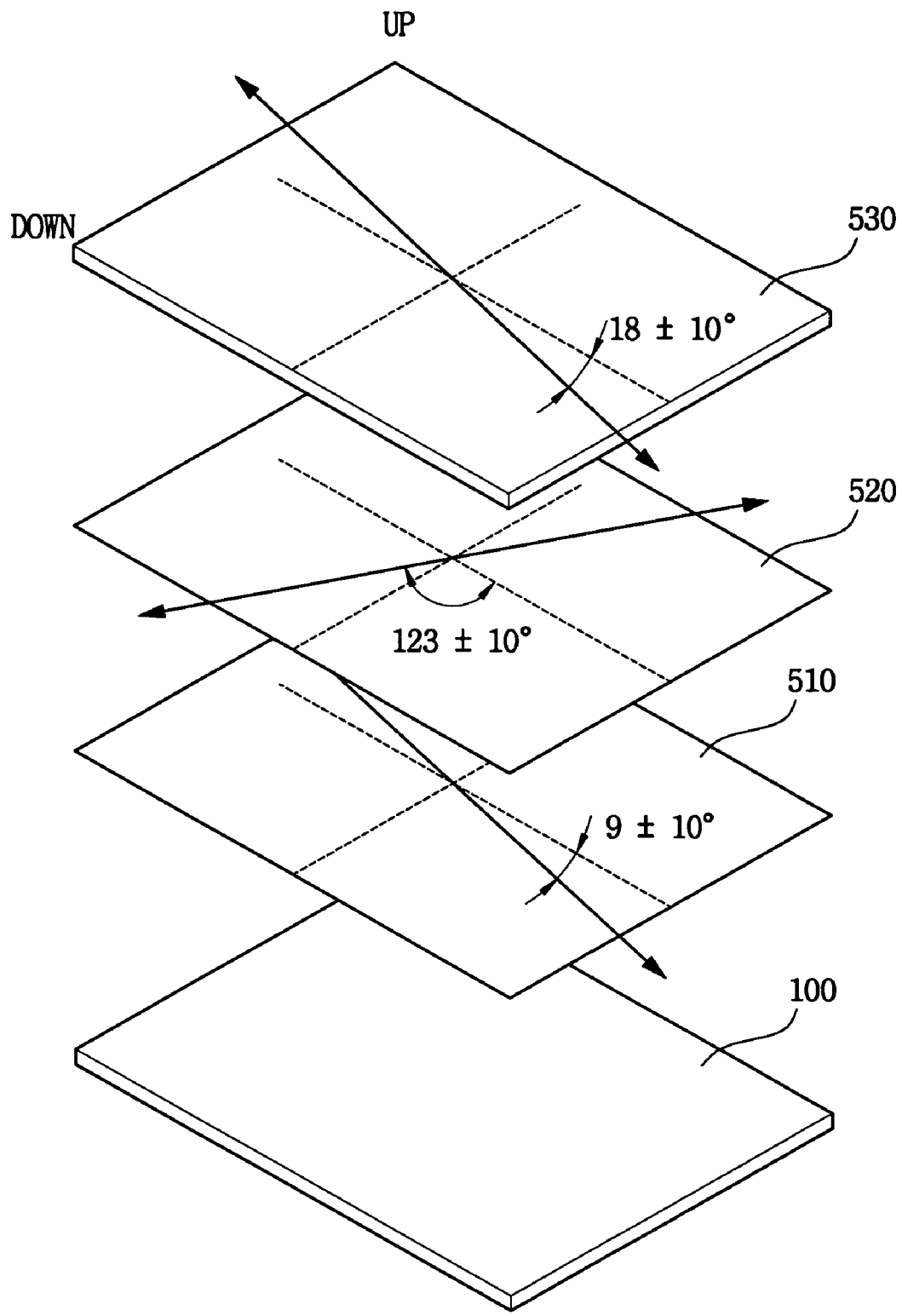
FIG. 19 is an exploded perspective view showing a lower optical film assembly of the LCD apparatus shown in FIG. 17.

FIG. 19 is an exploded perspective view showing a lower optical film assembly of the LCD apparatus shown in FIG. 17.

The lower λ/4 retardation film 510 is disposed under the array substrate 100. A sixth optical characteristics Δnd6 of the lower λ/4 retardation film 510 is about 120 nm to about 140 nm with respect to the reference wavelength. A slow axis of the lower λ/4 retardation film 510 forms at an angle of about −1 degree to about +19 degree with respect to the reference direction in the clockwise direction.

The lower λ/2 retardation film 520 is disposed under the lower λ/4 retardation film 516. A seventh optical characteristics Δnd7 of the lower λ/2 retardation film 520 is about 260 nm to about 280 nm with respect to the reference wavelength. A slow axis of the lower λ/2 retardation film 520 forms at an angle of about 113 degree to about 133 degree with respect to the reference direction in the clockwise direction.

The lower polarizer 530 is disposed under the lower λ/2 retardation film 520. An absorption axis of the lower polarizer 530 forms at an angle of about 8 degree to about 28 degree with respect to the reference direction in the clockwise direction.

In another exemplary embodiment, a slow axis of a lower λ/4 retardation film may form at an angle of about 161 degree to about 181 degree with respect to the reference direction in the clockwise direction. A slow axis of a lower λ/2 retardation film may form at an angle of about 47 degree to about 67 degree with respect to the reference direction in the clockwise direction. An absorption axis of a lower polarizer may form at an angle of about 152 degree to about 172 degree with respect to the reference direction in the clockwise direction.

Alternatively, the second and third thicknesses d2 and d3 may be substantially equal to each other.

The LCD apparatus may also include a reflective type LCD apparatus having a switching element, a pixel electrode that is electrically connected to a drain electrode of the switching element and a reflecting plate that is formed on the pixel electrode to reflect the natural light.

The LCD apparatus may also include a bottom ITO type. A pixel electrode of the bottom ITO typed LCD apparatus is formed under the organic insulating layer.

Figure 20:
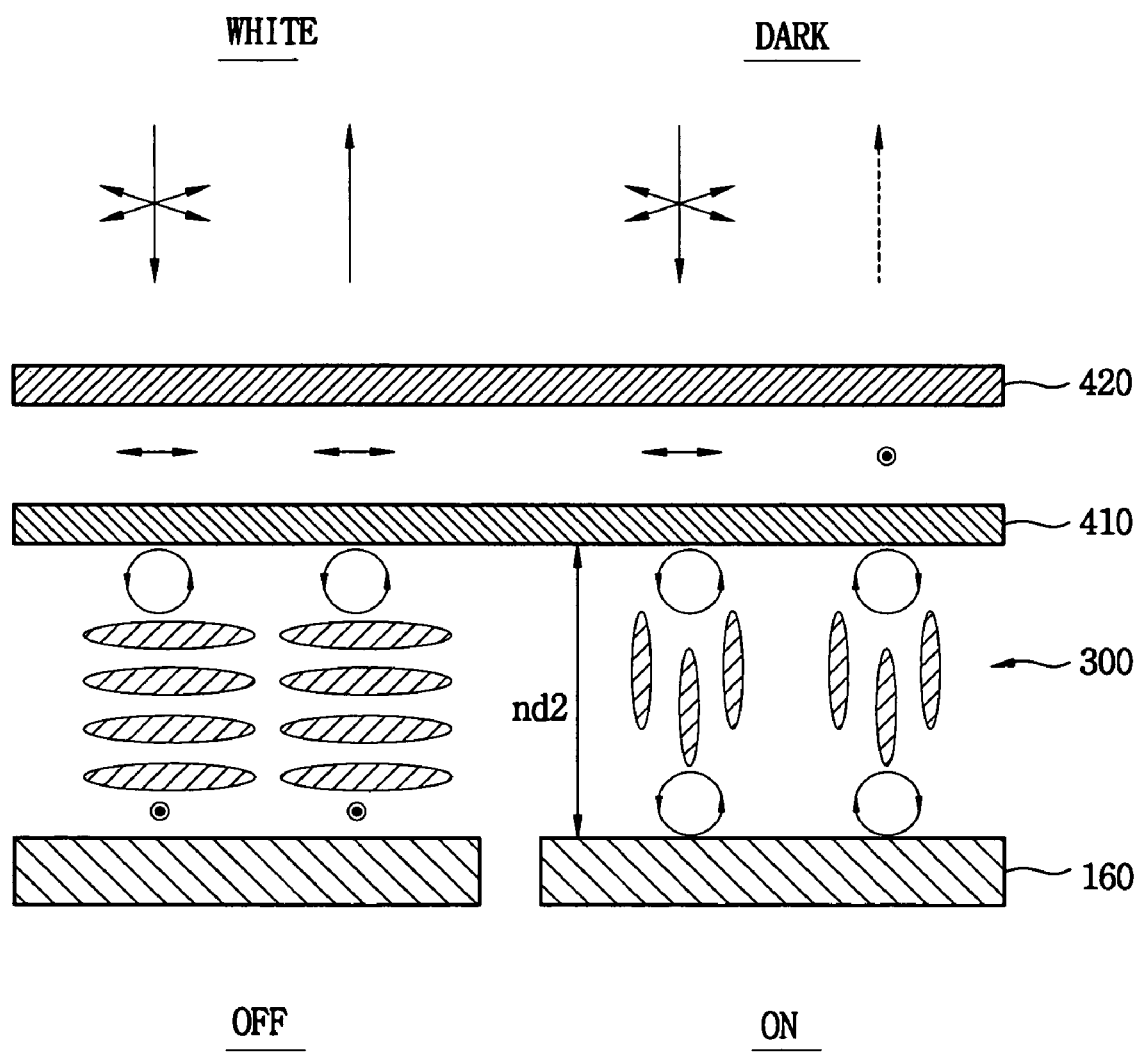
FIG. 20 is a cross-sectional view showing a reflection mode of the LCD apparatus shown in FIG. 17.
Figure 21:
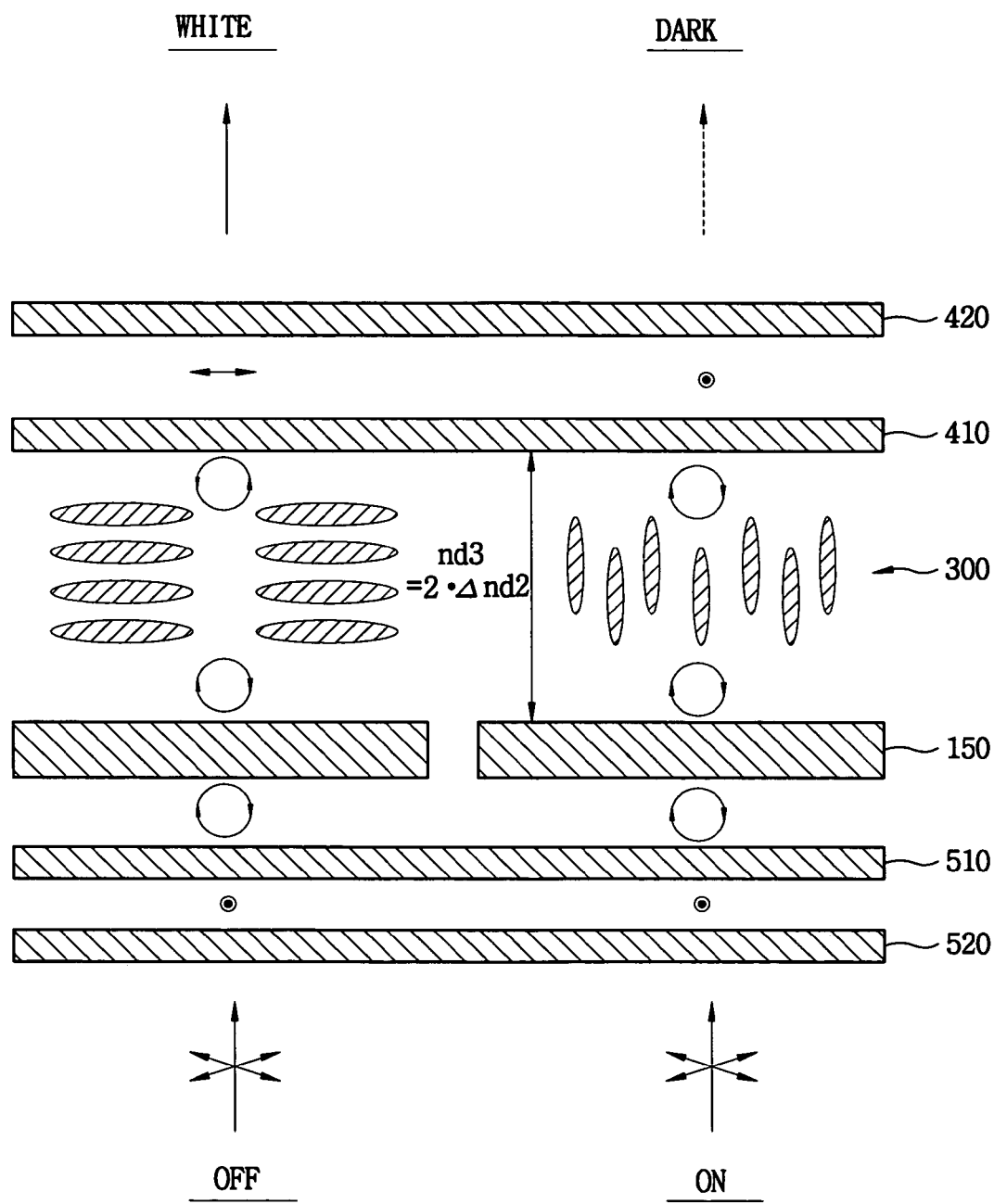
FIG. 21 is a cross-sectional view showing a transmission mode of the LCD apparatus shown in FIG. 17.

FIG. 20 is a cross-sectional view showing a reflection mode of the LCD apparatus shown in FIG. 17. FIG. 21 is a cross-sectional view showing a transmission mode of the LCD apparatus shown in FIG. 17. The LCD apparatus includes the liquid crystal layer 300 having a normally white mode. When an electric field is not applied to the liquid crystal layer 300 having the normally white mode, the LCD apparatus displays white color.

Referring to FIG. 20, when the electric field is not applied to the liquid crystal layer 300 in the reflection mode, the liquid crystal of the liquid crystal layer 300 is horizontally aligned. The natural light that is provided from an exterior to the liquid crystal layer 300 passes through the upper polarizer 420 so that the natural light is converted into a linearly polarized light. The linearly polarized light passes through the upper λ/4 retardation film 410 so that the linearly polarized light is converted into a left circularly polarized light. Alternatively, the linearly polarized light passes through the upper λ/4 retardation film 410 so that the linearly polarized light may be converted into a right circularly polarized light.

The left circularly polarized light passes through the liquid crystal layer 300 so that a phase of the left circularly polarized light is delayed by λ/4 to form a linearly polarized light. The optical characteristics of the liquid crystal layer 300 corresponding to the reflection mode are represented by the reference numeral Δnd2. The linearly polarized light that passes through the liquid crystal layer 300 is reflected from the reflecting plate 160. The reflecting plate may include an aluminum-neodymium (Al—Nd) alloy. The reflected light passes through the liquid crystal layer 300 so that a phase of the reflected light is delayed by λ/4 to form a left circularly polarized light.

The left circularly polarized light that is formed from the reflected light passes through the upper λ/4 retardation film 410 so that the left circularly polarized light is converted into a linearly polarized light. The linearly polarized light passes through the upper polarizer 420 so that the white color is displayed.

When the electric field is applied to the liquid crystal layer 300 in the reflection mode, the liquid crystal of the liquid crystal layer 300 is vertically aligned. The natural light that is provided from the exterior to the LCD apparatus passes through the upper polarizer 420 so that the natural light is converted into a linearly polarized light. The linearly polarized light passes through the upper λ/4 retardation film 410 so that the linearly polarized light is converted into a left circularly polarized light.

The left circularly polarized light passes through the liquid crystal layer 300, and the left circularly polarized light remains unchanged. The left circularly polarized light that passes through the liquid crystal layer 300 is reflected from the reflecting plate 160 so that the left circularly polarized light is converted into a right circularly polarized light. The right circularly polarized light passes through the liquid crystal layer 300, and the right circularly polarized light remains unchanged. The right circularly polarized light passes through the upper λ/4 retardation film 410 so that the right circularly polarized light is converted into a linearly polarized light. The linearly polarized light is blocked by the upper polarizer to display black color.

Referring to FIG. 21, when the electric field is not applied to the liquid crystal layer 300 in the transmission mode, the liquid crystal of the liquid crystal layer 300 is horizontally aligned. The artificial light generated from a backlight assembly passes through the lower polarizer 520 so that the artificial light is converted into a linearly polarized light. The linearly polarized light passes through the lower λ/4 retardation film 510 so that the linearly polarized light is converted into a right circularly polarized light. The right circularly polarized light passes through the pixel electrode that is transparent so that the right circularly polarized light remains unchanged. The second optical characteristics Δnd2 of the liquid crystal layer 300 corresponding to the reflection region is about a half of the third optical characteristics Δnd3 of the liquid crystal layer 300 corresponding to the transmission window 2145.

The right circularly polarized light that passes through the liquid crystal layer 300 so that a phase of the right circularly polarized light is delayed by λ/2 to form a right circularly polarized light. The right circularly polarized light passes through the upper λ/4 retardation film 410 so that the right circularly polarized light is converted into a linearly polarized light. The linearly polarized light passes through the upper polarizer 420 to display the white color.

When the electric field is applied to the liquid crystal layer 300 in the transmission mode, the liquid crystal of the liquid crystal layer 300 is vertically aligned. The artificial light generated from the backlight assembly passes through the lower polarizer 520 so that the artificial light is converted into a linearly polarized light. The linearly polarized light passes through the lower λ/4 retardation film 510 so that the linearly polarized light is converted into a right circularly polarized light. The right circularly polarized light passes through the pixel electrode 150 so that the right circularly polarized light remains unchanged.

The right circularly polarized light that passes through the pixel electrode 150 passes through the liquid crystal layer 300 so that the right circularly polarized light remains unchanged.

The right circularly polarized light that passes through the liquid crystal layer 300 passes through the upper λ/4 retardation film 410 so that the right circularly polarized light is converted into a linearly polarized light. The linearly polarized light is blocked by the upper polarizer 420 to display the black color.

Figure 22:
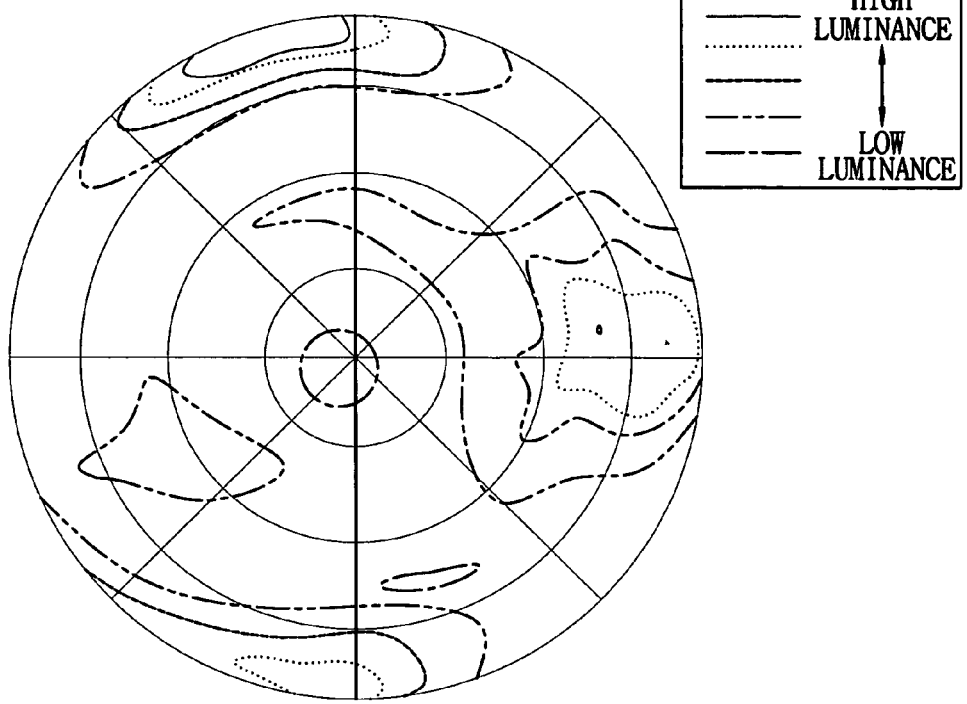
FIGS. 22 and 23 are graphs showing a relationship between a luminance and a viewing angle when an LCD apparatus in accordance with another exemplary embodiment of the present invention displays black color.
Figure 23:
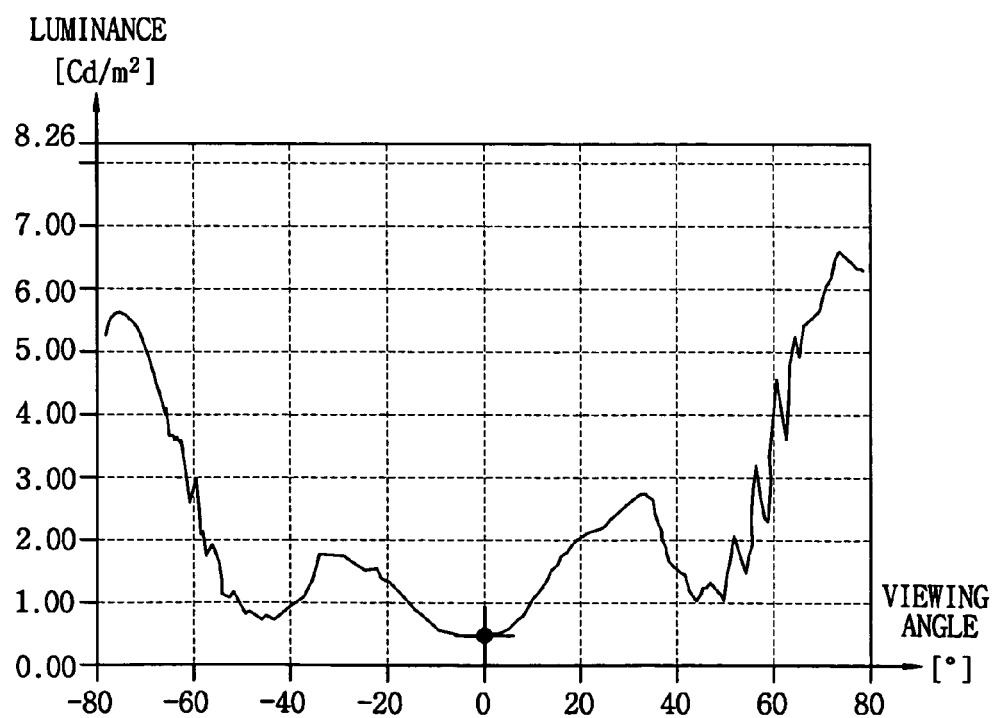

FIGS. 22 and 23 are graphs showing a relationship between a luminance and a viewing angle when an LCD apparatus in accordance with another exemplary embodiment of the present invention displays black color. Radius shown in FIG. 22 represents the viewing angle of an LCD panel of the LCD apparatus. A reference direction is in substantially parallel with a horizontal direction of the LCD panel.

Referring to FIGS. 22 and 23, a luminance of a portion of the LCD panel, which corresponds to a viewing angle between about 60 degree and about 80 degree in a direction at an angle of about 90 degree to about 120 degree in a counter-clockwise direction, is increased. Also, a luminance of a portion of the LCD panel, which corresponds to a viewing angle of about 40 degree to about 80 degree in a direction in substantially parallel with the reference direction, is increased. In addition, a luminance of a portion of the LCD panel, which corresponds to a viewing angle of about 80 degree in a direction at an angle of about 90 degree to about 120 degree in a clockwise direction, is increased. A luminance of remaining portion of the LCD panel is decreased to display the black color. In particular, a viewing angle viewed in front of the LCD panel is about 0.5 [Cd/m$^3$] so that an image display quality of the LCD panel is improved.

Figure 24:
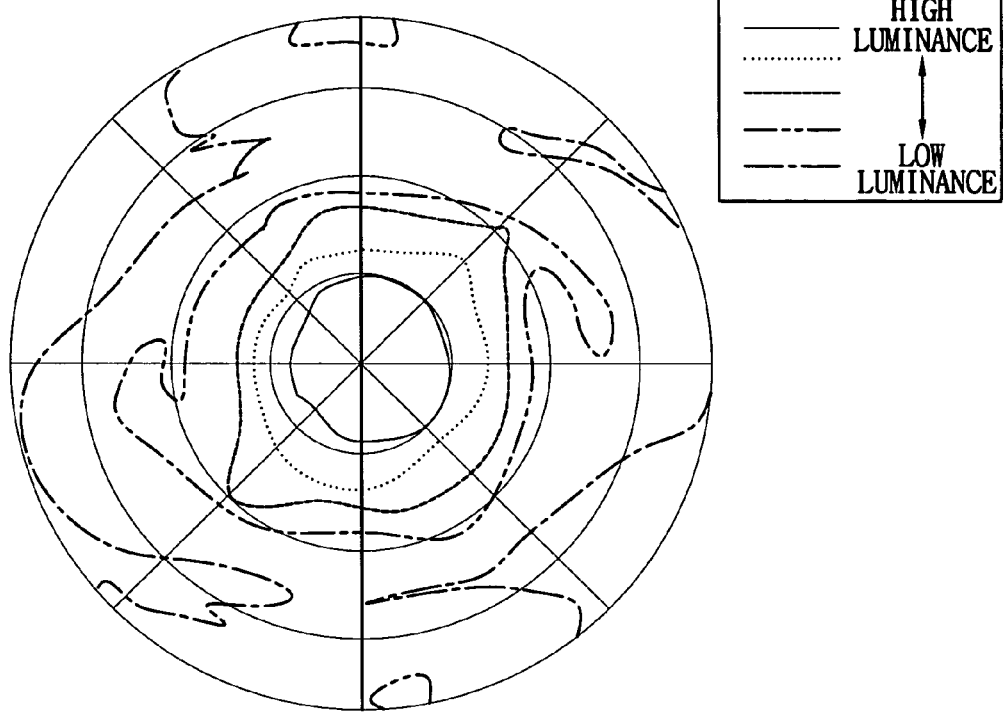
FIGS. 24 and 25 are graphs showing a relationship between a luminance and a viewing angle when an LCD apparatus in accordance with another exemplary embodiment of the present invention displays white color.
Figure 25:
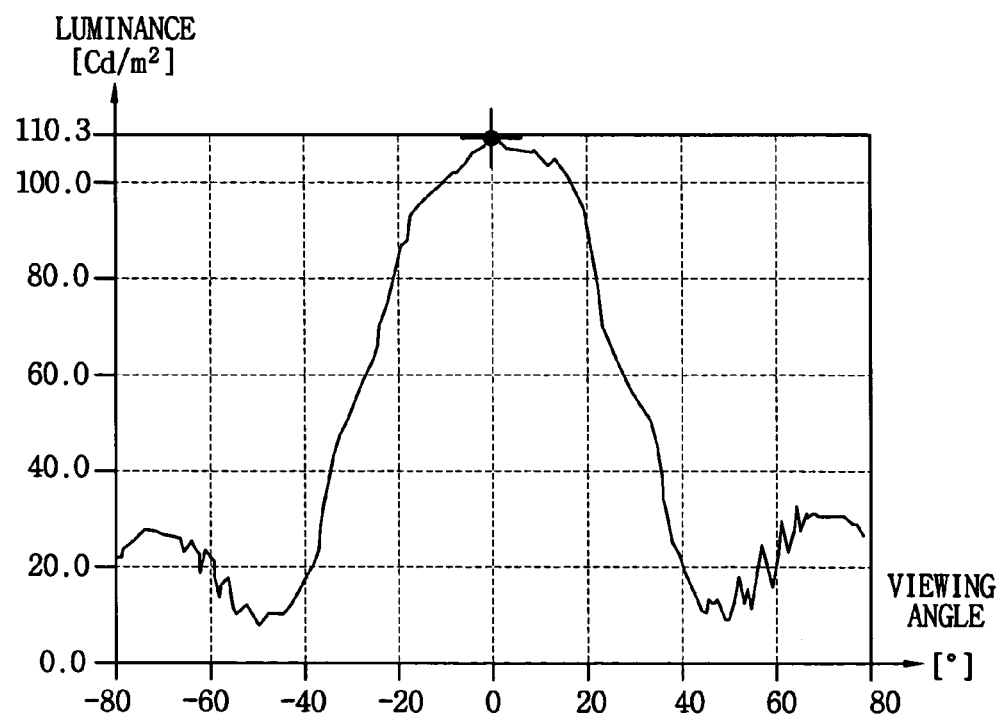

FIGS. 24 and 25 are graphs showing a relationship between a luminance and a viewing angle when an LCD apparatus in accordance with another exemplary embodiment of the present invention displays white color. Radius shown in FIG. 24 represents the viewing angle of an LCD panel of the LCD apparatus.

Referring to FIGS. 24 and 25, a luminance of a portion of the LCD panel, which corresponds to a viewing angle of about 0 degree to about 30 degree, is increased. A luminance viewed in front of the LCD panel is about 11 [Cd/m$^3$].

Figure 26:
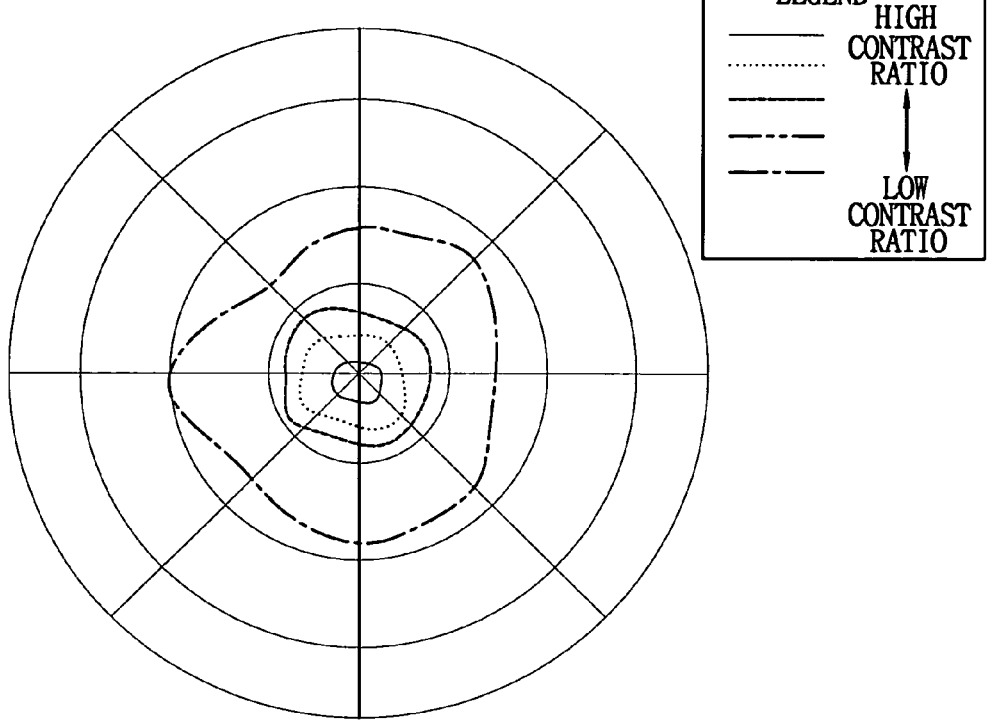
FIGS. 26 and 27 are graphs showing a relationship between a contrast ratio and a viewing angle of an LCD apparatus in accordance with another exemplary embodiment of the present invention.
Figure 27:
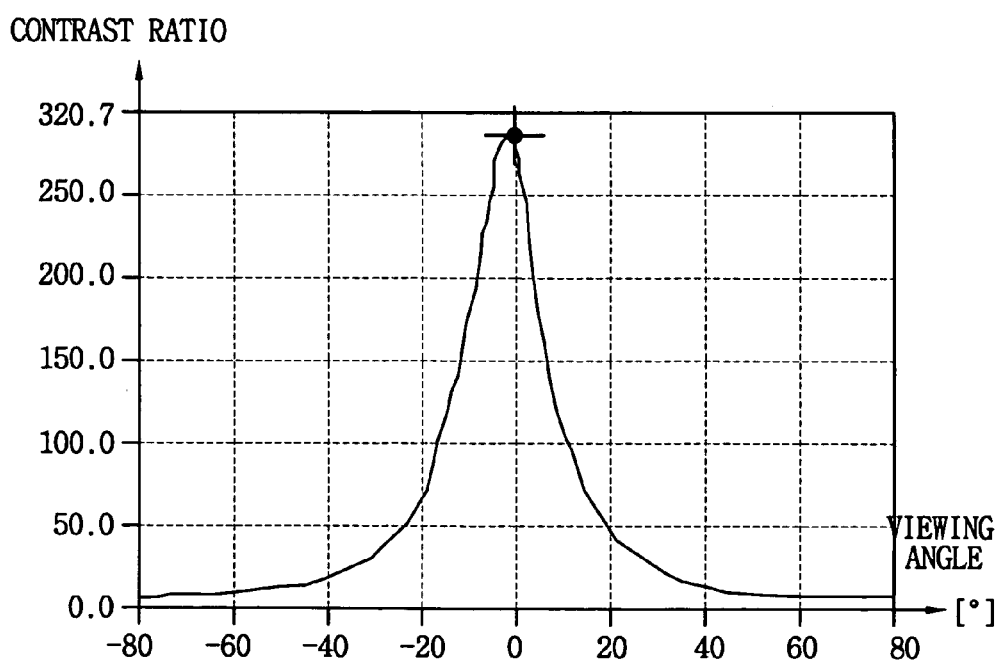

FIGS. 26 and 27 are graphs showing a relationship between a contrast ratio and a viewing angle of an LCD apparatus in accordance with another exemplary embodiment of the present invention. Radius shown in FIG. 26 represents the viewing angle of the LCD panel.

Referring to FIGS. 26 and 27, a contrast ratio of the LCD panel corresponding to a central portion is higher than that of the LCD panel corresponding to a peripheral portion to improve the image display quality of the LCD apparatus.

Hereinafter, the LCD apparatus having the optical film assembly shown in FIGS. 18 and 19 is compared with the LCD apparatus having the optical film assembly shown in FIG. 8.

The optical film assembly shown in FIG. 8 includes the upper λ/4 retardation film 412, the upper λ/2 retardation film 422, the upper polarizer 432, the lower λ/4 retardation film 512, the lower λ/2 retardation film 522 and the lower polarizer 532. The second optical characteristics Δnd2 of the upper λ/4 retardation film 412 may be about 140 nm, and the slow axis of the upper λ/4 retardation film 412 may form at an angle of about 44 degree with respect to the reference direction in the clockwise direction. The third optical characteristics Δnd3 of the upper λ/2 retardation film 422 may be about 260 nm, and the slow axis of the upper λ/2 retardation film 422 may form at an angle of about 166 degree with respect to the reference direction in the clockwise direction. The absorption axis of the upper polarizer 432 may form at an angle of about 150 degree with respect to the reference direction of the LCD panel in the clockwise direction. The fourth optical characteristics Δnd4 of the lower λ/4 retardation film 512 may be about 145 nm with respect to the reference wavelength, and the slow axis of the lower λ/4 retardation film 512 may form at an angle of about 46 degree with respect to the reference direction in the clockwise direction. The fifth optical characteristics Δnd5 of the lower λ/2 retardation film 522 may be about 270 nm, and the slow axis of the lower λ/2 retardation film 522 may form at an angle of about 105 degree with respect to the reference direction in the clockwise direction. The absorption axis of the lower polarizer 532 may form at an angle of about 120 degree with respect to the reference direction in the clockwise direction.

The optical film assembly shown in FIGS. 18 and 19 includes the upper λ/4 retardation film 410, the upper λ/2 retardation film 420, the upper polarizer 430, the lower λ/4 retardation film 510, the lower λ/2 retardation film 520 and the lower polarizer 530. The fourth optical characteristics Δnd4 of the upper λ/4 retardation film 410 may be about 140 nm, and the slow axis of the upper λ/4 retardation film 410 may form at an angle of about 146 degree with respect to the reference direction in the clockwise direction. The fifth optical characteristics Δnd5 of the upper λ/2 retardation film 420 may be about 260 nm, and the slow axis of the upper λ/2 retardation film 420 may form at an angle of about 91 degree with respect to the reference direction in the clockwise direction. The absorption axis of the upper polarizer 430 may form at an angle of about 77 degree with respect to the reference direction of the LCD panel in the clockwise direction. The sixth optical characteristics Δnd6 of the lower λ/4 retardation film 510 may be about 130 nm with respect to the reference wavelength, and the slow axis of the lower λ/4 retardation film 510 may form at an angle of about 9 degree with respect to the reference direction in the clockwise direction. The seventh optical characteristics Δnd7 of the lower λ/2 retardation film 520 may be about 270 nm, and the slow axis of the lower λ/2 retardation film 520 may form at an angle of about 123 degree with respect to the reference direction in the clockwise direction. The absorption axis of the lower polarizer 530 may form at an angle of about 18 degree with respect to the reference direction in the clockwise direction.

A light reflectivity of the LCD apparatus having the optical film assembly shown in FIG. 8 is about 8%, and is substantially the same as that of the LCD apparatus having the optical film assembly shown in FIGS. 18 and 19. A contrast ratio of the reflection mode of the LCD apparatus having the optical film assembly shown in FIG. 8 is about 30, and is substantially the same as that of the LCD apparatus having the optical film assembly shown in FIGS. 18 and 19. A light reflectivity of an integrating sphere of the LCD apparatus having the optical film assembly shown in FIG. 8 is about 5%, and is substantially the same as that of the LCD apparatus having the optical film assembly shown in FIGS. 18 and 19. A contrast ratio of the integrating sphere of the LCD apparatus having the optical film assembly shown in FIG. 8 is about 10, and is substantially the same as that of the LCD apparatus having the optical film assembly shown in FIGS. 18 and 19.

A luminance viewed in front of the LCD panel having the optical film assembly shown in FIG. 8 is about 70 [Cd/m$^3$]. A luminance viewed in front of the LCD panel having the optical film assembly shown in FIGS. 18 and 19 is about 180 [Cd/m$^3$]. The luminance viewed in front of the LCD panel having the optical film assembly shown in FIGS. 18 and 19 is increased by about 260% than that of the LCD panel having the optical film assembly shown in FIG. 8. A contrast ratio viewed in front of the LCD panel having the optical film assembly shown in FIG. 8 is about 110. A contrast ratio viewed in front of the LCD panel having the optical film assembly shown in FIGS. 18 and 19 is about 250. The contrast ratio viewed in front of the LCD panel having the optical film assembly shown in FIGS. 18 and 19 is increased by about 230% than that of the LCD panel having the optical film assembly shown in FIG. 8. Viewing angles of an upper portion, a lower portion, a left portion and a right portion of the LCD panel having the optical film assembly shown in FIG. 8 are about 28, 28, 52 and 22, respectively. Viewing angles of an upper portion, a lower portion, a left portion and a right portion of the LCD panel shown in FIGS. 18 and 19 are about 50, 50, 50 and 48, respectively. Therefore, the viewing angles are increased.

According to the present invention, the optical conditions of the upper and lower optical film assembly are optimized so that the light transmittance, the contrast ratio and the viewing angle of the LCD apparatus are improved.

The LCD apparatus includes a reflective type LCD apparatus, a transmissive type LCD apparatus or a transmissive-reflective LCD apparatus. In the transmissive-reflective LCD apparatus, the thickness of the liquid crystal layer corresponding to the reflection region is different from that of the liquid crystal layer corresponding to the transmission window. Alternatively, the thickness of the liquid crystal layer corresponding to the reflection region may be substantially the same as that of the liquid crystal layer corresponding to the transmission window.

This invention has been described with reference to the exemplary embodiments. It is evident, however, that many alternative modifications and variations will be apparent to those having skill in the art in light of the foregoing description. Accordingly, the present invention embraces all such alternative modifications and variations as fall within the spirit and scope of the appended claims.

What is claimed is:

1. An optical film assembly for a liquid crystal display panel including a liquid crystal layer having a twist angle of about −10 degree to about +10 degree, the optical film assembly comprising:
   an upper polarizer disposed over an upper substrate of the liquid crystal display panel, the upper polarizer including an absorption axis forming at an angle of about 37 degree to about 57 degree in a clockwise direction with respect to a major axis of a liquid crystal of the liquid crystal layer, and the liquid crystal being disposed adjacent to the upper substrate;
   an upper λ/2 retardation film disposed between the upper substrate and the upper polarizer, the upper λ/2 retardation film including a first optical characteristics Δnd1 of about 250 nm to about 270 nm, a slow axis of the upper λ/2 retardation film forming at an angle of about 156 degree to about 176 degree in the clockwise direction with respect to the absorption axis; and
   an upper λ/4 retardation film disposed between the upper substrate and the upper λ/2 retardation film, the upper λ/4 retardation film including a second optical characteristics Δnd2 of about 130 nm to about 150 nm, a slow axis of the upper λ/4 retardation film forming at an angle of about 101 degree to about 121 degree in the clockwise direction with respect to the absorption axis,
   wherein 'Δn', 'd1' and 'd2' denote an anisotropy of a refractive index, a thickness of the upper λ/2 retardation film and a thickness of the upper λ/4 retardation film, respectively.

2. An optical film assembly for a liquid crystal display panel including a liquid crystal layer having a twist angle of about −10 degree to about +10 degree, the optical film assembly comprising:
   a lower polarizer disposed under a lower substrate of the liquid crystal display panel, the lower polarizer including an absorption axis forming at an angle of about 38 degree to about 58 degree in a clockwise direction with respect to a major axis of a liquid crystal of the liquid crystal layer, and the liquid crystal being disposed adjacent to the lower substrate;
   a lower λ/2 retardation film disposed between the lower substrate and the lower polarizer, the lower λ/2 retardation film including a first optical characteristics Δnd1 of about 260 nm to about 280 nm, a slow axis of the lower λ/2 retardation film forming at an angle of about 65 degree to about 85 degree in the clockwise direction with respect to the absorption axis; and
   a lower λ/4 retardation film disposed between the lower substrate and the lower λ/2 retardation film, the lower λ/4 retardation film including a second optical characteristics Δnd2 of about 120 nm to about 140 nm, a slow axis of the lower λ/4 retardation film forming at an angle of about −1 degree to about 19 degree in the clockwise direction with respect to the absorption axis,
   wherein 'Δn', 'd1' and 'd2' denote an anisotropy of a refractive index, a thickness of the lower λ/2 retardation film and a thickness of the lower λ/4 retardation film, respectively.

3. A liquid crystal display apparatus comprising:
   a liquid crystal display panel including an upper substrate, a lower substrate corresponding to the upper substrate and a liquid crystal layer disposed between the upper and lower substrates to have a twist angle of about −10 degree to about +10 degree;
   an upper polarizer disposed over the upper substrate, the upper polarizer including an absorption axis forming at an angle of about 37 degree to about 57 degree in a clockwise direction with respect to a major axis of a liquid crystal of the liquid crystal layer, and the liquid crystal being disposed adjacent to the upper substrate;
   an upper λ/2 retardation film disposed between the upper substrate and the upper polarizer, the upper λ/2 retardation film including a first optical characteristics Δnd1 of about 250 nm to about 270 nm, a slow axis of the upper λ/2 retardation film forming at an angle of about 156 degree to about 176 degree in the clockwise direction with respect to the absorption axis; and
   an upper λ/4 retardation film disposed between the upper substrate and the upper λ/2 retardation film, the upper λ/4 retardation film including a second optical characteristics Δnd2 of about 130 nm to about 150 nm, a slow axis of the upper λ/4 retardation film forming at an angle of about 101 degree to about 121 degree in the clockwise direction with respect to the absorption axis, wherein 'Δn', 'd1' and 'd2' denote an anisotropy of a refractive index, a thickness of the upper λ/2 retardation film and a thickness of the upper λ/4 retardation film, respectively.

4. The liquid crystal display apparatus of claim 3, wherein the liquid crystal layer comprises a homogeneous alignment mode.

5. The liquid crystal display apparatus of claim 3, wherein the lower substrate comprises a switching element, a pixel electrode electrically connected to a drain electrode of the switching element and a reflecting plate formed on the pixel electrode to reflect an artificial light.

6. The liquid crystal display apparatus of claim 3, wherein the lower substrate comprises a switching element, a pixel electrode electrically connected to a drain electrode of the switching element, a reflection region where a natural light is reflected from and a transmission window where an artificial light passes through.

7. The liquid crystal display apparatus of claim 6, wherein the liquid crystal layer comprises a first thickness corresponding to the reflection region and a second thickness corresponding to the transmission window, and the first thickness is different from the second thickness.

8. A liquid crystal display apparatus comprising:
a liquid crystal display panel including an upper substrate, a lower substrate and a liquid crystal layer disposed between the upper and lower substrates to have a twist angle of about −10 degree to about +10 degree;
a lower polarizer disposed under the lower substrate, the lower polarizer including an absorption axis forming at an angle of about 38 degree to about 58 degree in a clockwise direction with respect to a major axis of a liquid crystal of the liquid crystal layer, and the liquid crystal being disposed adjacent to the lower substrate;
a lower λ/2 retardation film disposed between the lower substrate and the lower polarizer, the lower λ/2 retardation film including a first optical characteristics Δnd1 of about 260 nm to about 280 nm, a slow axis of the lower λ/2 retardation film forming at an angle of about 65 degree to about 85 degree in the clockwise direction with respect to the absorption axis; and
a lower λ/4 retardation film disposed between the lower substrate and the lower λ/2 retardation film, the lower λ/4 retardation film including a second optical characteristics Δnd2 of about 120 nm to about 140 nm, a slow axis of the lower λ/4 retardation film forming at an angle of about −1 degree to about 19 degree in the clockwise direction with respect to the absorption axis,
wherein 'Δn', 'd1' and 'd2' denote an anisotropy of a refractive index, a thickness of the lower λ/2 retardation film and a thickness of the lower λ/4 retardation film, respectively.

9. The liquid crystal display apparatus of claim 8, wherein the liquid crystal layer comprises a homogeneous alignment mode.

10. The liquid crystal display apparatus of claim 8, wherein the lower substrate comprises a switching element, a pixel electrode electrically connected to a drain electrode of the switching element and a reflecting plate formed on the pixel electrode to reflect an artificial light.

11. The liquid crystal display apparatus of claim 8, wherein the lower substrate comprises a switching element, a pixel electrode electrically connected to a drain electrode of the switching element, a reflection region where a natural light is reflected from and a transmission window where an artificial light passes through.

12. The liquid crystal display apparatus of claim 11, wherein the liquid crystal layer comprises a first thickness corresponding to the reflection region and a second thickness corresponding to the transmission window, and the first thickness is different from the second thickness.

* * * * *